(12) United States Patent
Otani et al.

(10) Patent No.: US 9,812,153 B2
(45) Date of Patent: Nov. 7, 2017

(54) IMAGE AND AUDIO REPRODUCTION DEVICE AND METHOD

(71) Applicant: FUJITSU LIMITED, Kawasaki-shi, Kanagawa (JP)

(72) Inventors: Takeshi Otani, Kawasaki (JP); Toshiyuki Fukuoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/237,075

(22) Filed: Aug. 15, 2016

(65) Prior Publication Data

US 2017/0061990 A1    Mar. 2, 2017

(30) Foreign Application Priority Data

Aug. 31, 2015   (JP) ................. 2015-171263

(51) Int. Cl.
| | |
|---|---|
| H04N 5/92 | (2006.01) |
| G10L 25/57 | (2013.01) |
| G11B 27/34 | (2006.01) |
| H04N 5/93 | (2006.01) |
| G10L 25/06 | (2013.01) |
| H04N 9/82 | (2006.01) |
| H04R 3/00 | (2006.01) |
| H04R 1/32 | (2006.01) |
| H04R 1/02 | (2006.01) |

(52) U.S. Cl.
CPC .............. *G10L 25/57* (2013.01); *G10L 25/06* (2013.01); *G11B 27/34* (2013.01); *H04N 5/9305* (2013.01); *H04N 9/8211* (2013.01); *H04R 3/005* (2013.01); *H04R 1/028* (2013.01); *H04R 1/326* (2013.01); *H04R 2499/11* (2013.01)

(58) Field of Classification Search
CPC ......... G10L 25/57; G11B 27/34; H04R 1/326; H04N 5/9305
USPC ....... 386/337, 338, 339, 340, 210, 224, 248, 386/285

See application file for complete search history.

(56) References Cited

U.S. PATENT DOCUMENTS

| | | | |
|---|---|---|---|
| 9,368,110 B1* | 6/2016 | Hershey | ............... G10L 25/51 |
| 2012/0069714 A1 | 3/2012 | Nakadai et al. | |
| 2014/0072142 A1 | 3/2014 | Nakadai et al. | |

(Continued)

FOREIGN PATENT DOCUMENTS

| | | |
|---|---|---|
| JP | 2003-244797 | 8/2003 |
| JP | 2011-71685 | 4/2011 |

(Continued)

*Primary Examiner* — Robert Chevalier
(74) *Attorney, Agent, or Firm* — Fujitsu Patent Center

(57) ABSTRACT

An image and audio reproduction device obtains an image captured by an image capturing device and a plurality of acoustic signals whose arrival directions are respectively a plurality of locations in an image capturing scope of the image capturing device, and sets, as one group, arrival directions of acoustic signals with a high degree of similarity of amounts of characteristics on the basis of a degree of similarity of the amounts of characteristics between the acoustic signals that are from the arrival directions adjacent to each other. The image and audio reproduction device adds information to the image captured by the image capturing device so as to reproduce the image, the information representing a position of the group in an image capturing scope of the image capturing device.

19 Claims, 21 Drawing Sheets

(56) References Cited

U.S. PATENT DOCUMENTS

2016/0171965 A1\* 6/2016 Arai ................ H04R 29/00
381/56

FOREIGN PATENT DOCUMENTS

| JP | 2012-42465 | 3/2012 |
|---|---|---|
| JP | 2014-56181 | 3/2014 |

\* cited by examiner

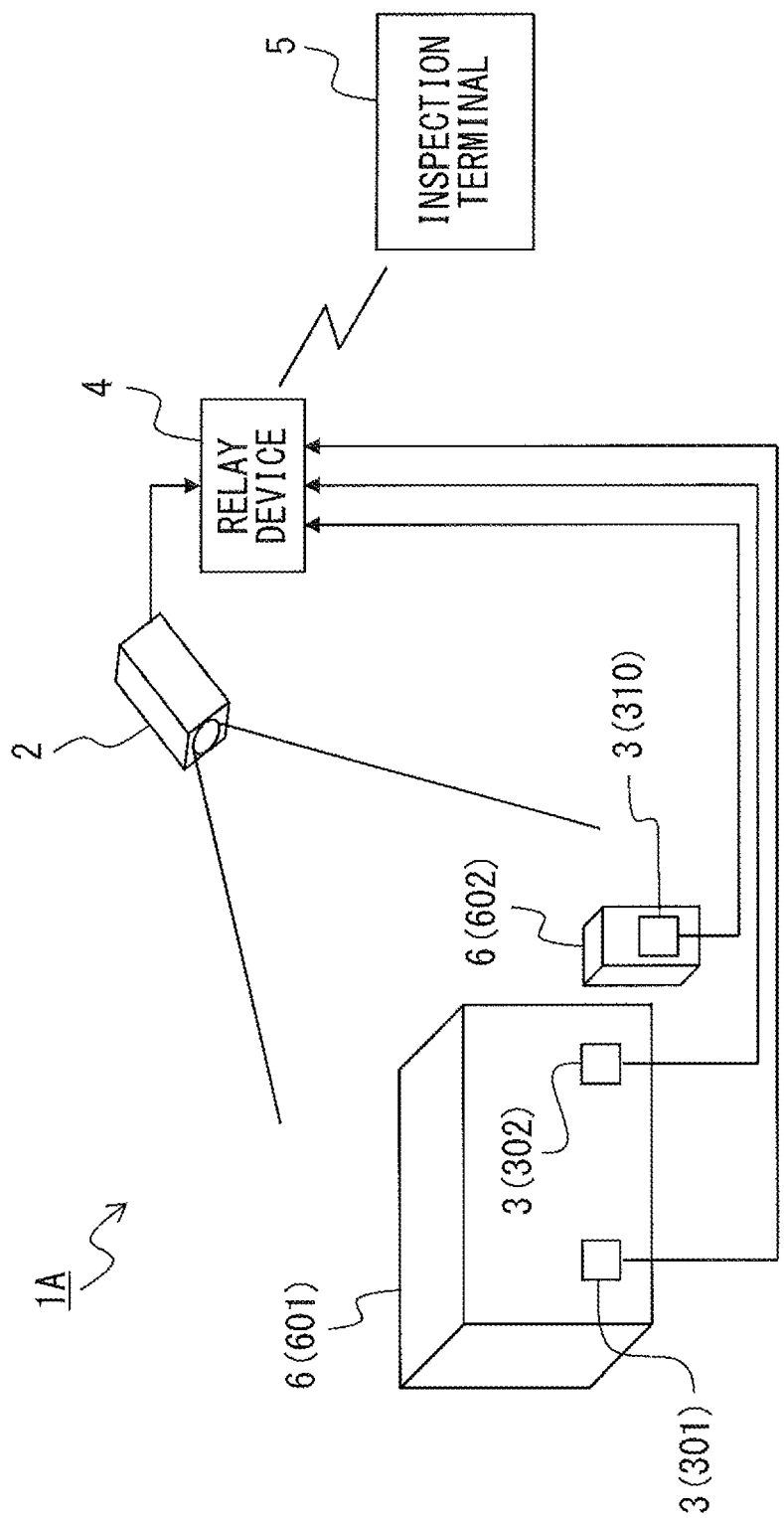
F I G. 1

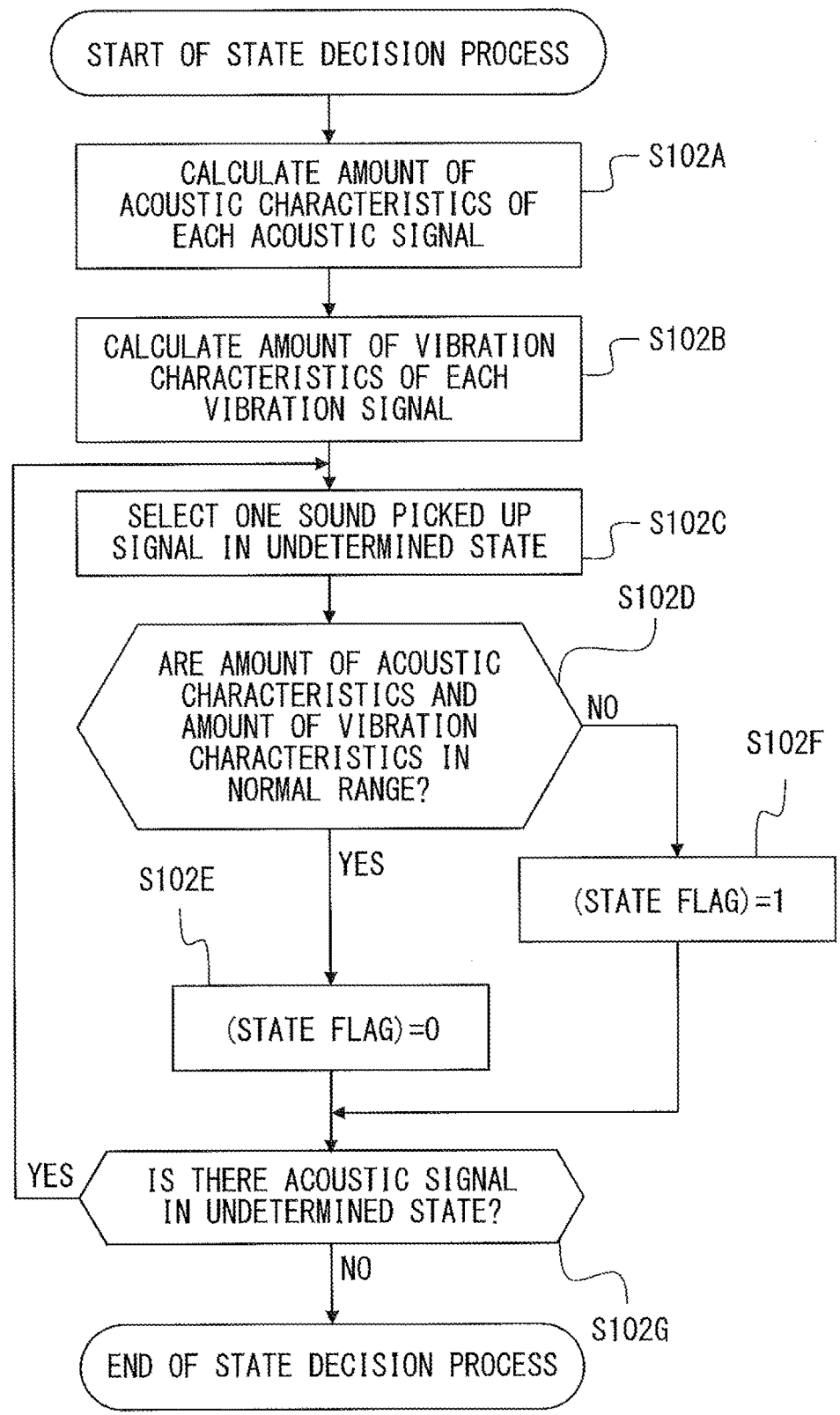
F I G. 7

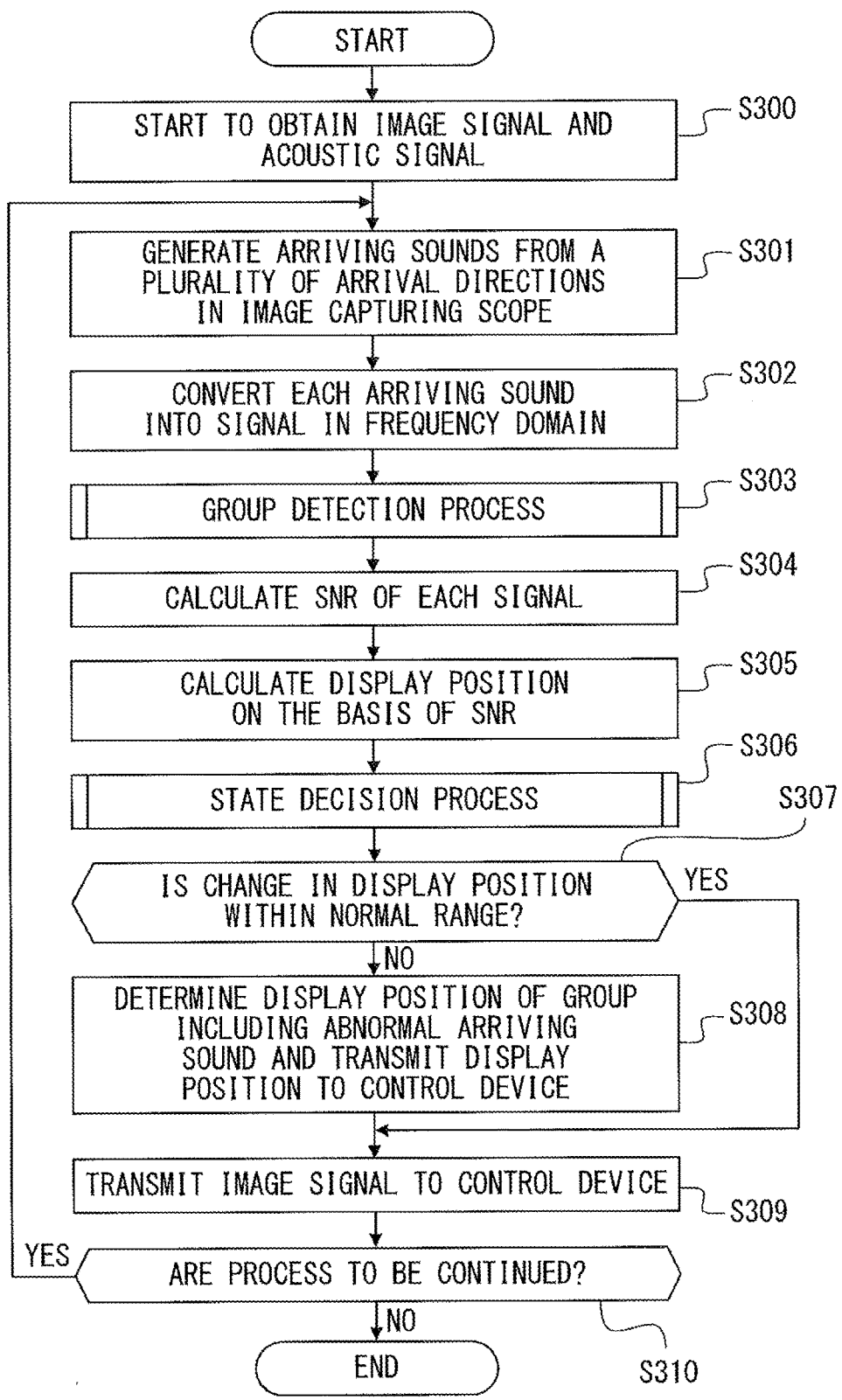
F I G. 19

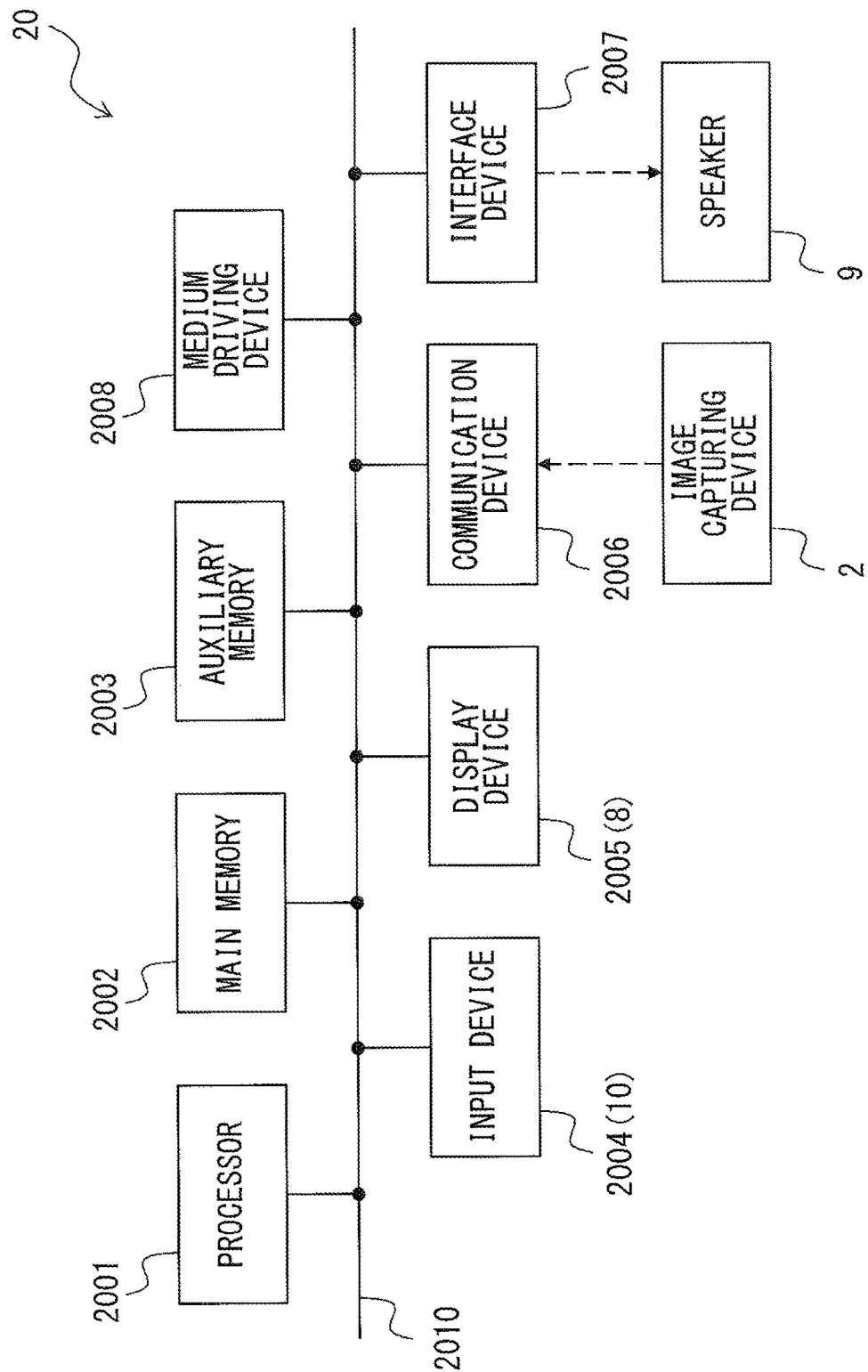
F I G. 21

IMAGE AND AUDIO REPRODUCTION DEVICE AND METHOD

CROSS-REFERENCE TO RELATED APPLICATION

This application is based upon and claims the benefit of priority of the prior Japanese Patent Application No. 2015-171263, filed on Aug. 31, 2015, the entire contents of which are incorporated herein by reference.

FIELD

The embodiments discussed herein are related to a device that reproduces an image and audio.

BACKGROUND

As a technique related to an image and audio reproduction device that reproduces an image captured by an image capturing device and audio picked up by a sound pickup device, a technique that selectively reproduces audio from an attention area in an image that is being reproduced is known (see Document 1 for example).

Also, as a technique of estimating a direction of a target sound, a technique of estimating a direction of a sound source by using a spatial spectrum calculated on the basis of a plurality of correlation matrixes of acoustic signals and correlation matrixes of noise signals is known (see Document 2 for example).

Also, as a technique of estimating a direction of a sound source of a particular type, a technique of identifying the type of a sound source of an acoustic signal on the basis of the likelihood of the type of a sound source associated with an amount of acoustic characteristics so as to estimate the direction of the sound source on the basis of an acoustic signal of a sound source of the identified type is known (see Document 3 for example).

Further, a technique of performing an auditory lateralization process etc. on an audio signal by using a signal process device provided separately from a host device for reproducing an image, so that the loads on a central processing unit (CPU) are reduced is known (see Document 4 for example).

Document 1: Japanese Laid-open Patent Publication No. 2011-71685
Document 2: Japanese Laid-open Patent Publication No. 2014-56181
Document 3: Japanese Laid-open Patent Publication No. 2012-42465
Document 4: Japanese Laid-open Patent Publication No. 2003-244797

SUMMARY

According to an aspect of the embodiment, an image and audio reproduction device comprising: a memory configured to store an image captured by an image capturing device and a plurality of acoustic signals whose arrival directions are respectively a plurality of locations, at which a sound is picked up by a sound pickup device, in an image capturing scope of the image capturing device; and a processor configured to set, as one group, arrival directions of acoustic signals with a high degree of similarity of amounts of characteristics on the basis of a degree of similarity of the amounts of characteristics between acoustic signals that are from the arrival directions adjacent to each other, and to add information to the image so as to reproduce the image, the information representing a position of the group in an image capturing scope of the image capturing device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF DRAWINGS

FIG. 1 illustrates a configuration example of an inspection system according to a first embodiment;

FIG. 7 is a flowchart explaining contents of a state decision process in the reproduction process according to the first embodiment;

FIG. 19 is a flowchart explaining contents of a reproduction process performed by the image and audio reproduction device according to the third embodiment;

FIG. 21 illustrates a hardware configuration of a computer.

DESCRIPTION OF EMBODIMENTS

Figure 2:
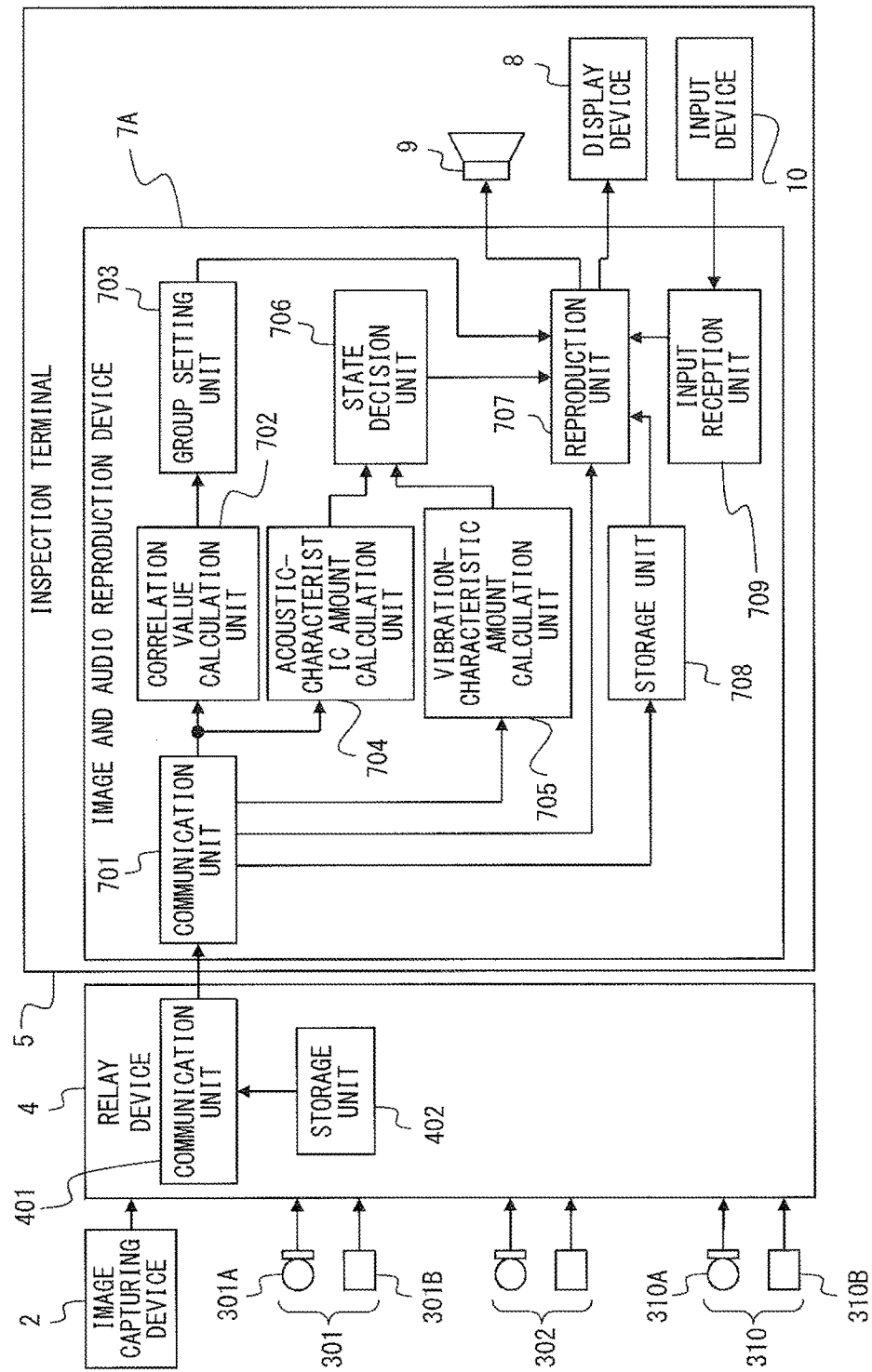
FIG. 2 is a block diagram illustrating a functional configuration of an inspection terminal used in the inspection system according to the first embodiment.

In facilities, such as a factory, having various types of equipment including power generating equipment etc., prompt discovery of abnormality of each piece of equipment is vital. Thus, in maintenance services of factories etc., prompt detection of an abnormal sound of equipment and prompt identification of the source of the abnormal sound are vital.

Also, maintenance services of factories have increased its efficiency by using the Information and Communication Technology (ICT) such as for example one utilizing mobile terminals, e.g., a tablet computer in recent years. Regarding the increase in efficiency by the use of the Information and Communication Technology, a sound arriving from a direction corresponding to a location (attention area) selected in an image (window) during the reproduction of the image captured by an image capturing device can selectively be reproduced by utilizing the technique disclosed by Document 1 etc.

However, when sounds of a plurality of locations in a window are to be reproduced, each of such locations is to be selected so as to conduct the reproduction in a one-by-one manner. This makes the confirmation operation troublesome when the presence or absence of abnormal sounds is to be confirmed for a plurality of locations in the image capturing scope in a maintenance service.

Preferred embodiments of the present invention will be explained with reference to accompanying drawings.

First Embodiment

FIG. 1 illustrates a configuration example of an inspection system according to a first embodiment.

As illustrated in FIG. 1, an inspection system 1A according to the present embodiment includes an image capturing device 2, a plurality of sensors 3 (301, 302 and 310), a relay device 4 and an inspection terminal 5.

The image capturing device 2 is a device that captures images of pieces of equipment 6 (601 and 602) that are inspection targets.

The plurality of sensors 3 are sensors that include sound pickup devices (microphones) that pick up acoustic signals. The present embodiment uses, as the sensor 3, a compound sensor that includes a sound pickup device for picking up an acoustic signal and a vibration sensor for detecting vibrations. The sensor 3 is located in the vicinity of a location (for example a power generation unit, a movable unit, etc.) in which sound is generated in the inspection-target equipment. Hereinafter, the sensor 3 is also referred to as a compound sensor.

The relay device 4 is a device that obtains an image captured by the image capturing device 2 and a signal output from each compound sensor 3 (acoustic signal and vibration signal) so as to transfer them to the inspection terminal 5. The inspection terminal 5 is a device that reproduces an image and an acoustic signal obtained via the relay device 4. The relay device 4 and the inspection terminal 5 are connected to each other in such a manner that communications are possible in a form of a wireless communication based on for example a communications standard standardized by the Institute of Electrical and Electronic Engineers (IEEE).

FIG. 2 is a block diagram illustrating a functional configuration of an inspection terminal used in the inspection system according to the first embodiment.

As illustrated in FIG. 2, the inspection terminal 5 according to the present embodiment includes an image and audio reproduction device 7A, a display device 8, a speaker 9 and an input device 10.

The image and audio reproduction device 7A includes a communication unit 701, a correlation value calculation unit 702, a group setting unit 703, an acoustic-characteristic amount calculation unit 704, a vibration-characteristic amount calculation unit 705, a state decision unit 706, a reproduction unit 707, a storage unit 708 and an input reception unit 709.

The communication unit 701 conducts a wireless communication with a communication unit 401 of the relay device 4 so as to obtain an image captured by the image capturing device 2, signals output from the compound sensors 301, 302 and 310 (acoustic signal and vibration signal), and sensor position information. Sensor position information is stored in for example a storage unit 402 of the relay device 4. The communication unit 701 outputs an obtained image to the reproduction unit 707. Also, the communication unit 701 outputs an obtained acoustic signal to the correlation value calculation unit 702 and the acoustic-characteristic amount calculation unit 704. The communication unit 701 also outputs an obtained vibration signal to the vibration-characteristic amount calculation unit 705. Further, the communication unit 701 outputs sensor position information to the correlation value calculation unit 702 and stores it in the storage unit 708.

On the basis of the input acoustic signals and sensor position information, the correlation value calculation unit 702 calculates a correlation value between acoustic signals obtained from sound pickup devices (compound sensors 3) that are adjacent to each other. The group setting unit 703 compares the calculated correlation value between acoustic signals with a prescribed correlation threshold so as to determine the presence or absence of a correlation between acoustic signals. Also, the group setting unit 703 performs grouping in which a pair of arrival directions of acoustic signals with a correlation between them is set as one group, on the basis of the determination results about the presence or absence of correlations between acoustic signals. The group setting unit 703 outputs information on a set group to the reproduction unit 707.

The acoustic-characteristic amount calculation unit 704 analyzes an input acoustic signal so as to calculate a prescribed amount of acoustic characteristics. The vibration-characteristic amount calculation unit 705 analyzes an input vibration signal so as to obtain an amount of vibration characteristics. On the basis of the calculated amount of acoustic characteristics and amount of vibration characteristics, the state decision unit 706 decides whether or not a signal output from each compound sensor 3 is a signal in a normal condition. The state decision unit 706 outputs the decision result to the reproduction unit 707.

When the decision result of the state decision unit 706 indicates that the compound sensor 3 having output an acoustic signal or a vibration signal that is not normal exists, the reproduction unit 707 outputs information representing the set position of that compound sensor 3 in the image (in the window of the display device) to the display device 8 together with the image. Also, when there exists the compound sensor 3 that output an acoustic signal or a vibration signal that is not normal, the reproduction unit 707 outputs to the compound sensor 3 the image and information representing a group including the compound sensor 3 having output a signal that is not normal from among the groups set by the group setting unit 703. Note that when the acoustic signals and vibration signals of all the compound sensors 3 are normal, the reproduction unit 707 outputs only an input image to the display device 8.

Further, the reproduction unit 707 selects an acoustic signal arriving from a direction corresponding to a point in an image specified by the operator so as to output the signal to the speaker 9. The operator manipulates the input device 10 so as to specify a point in an image. In response to the manipulation of the input device 10 by the operator, an input signal in accordance with the manipulation content is input to the input reception unit 709 of the image and audio reproduction device 7A from the input device 10. When the input signal is a signal related to the reproduction of an acoustic signal, the input reception unit 709 outputs the input signal to the reproduction unit 707.

Figure 3:
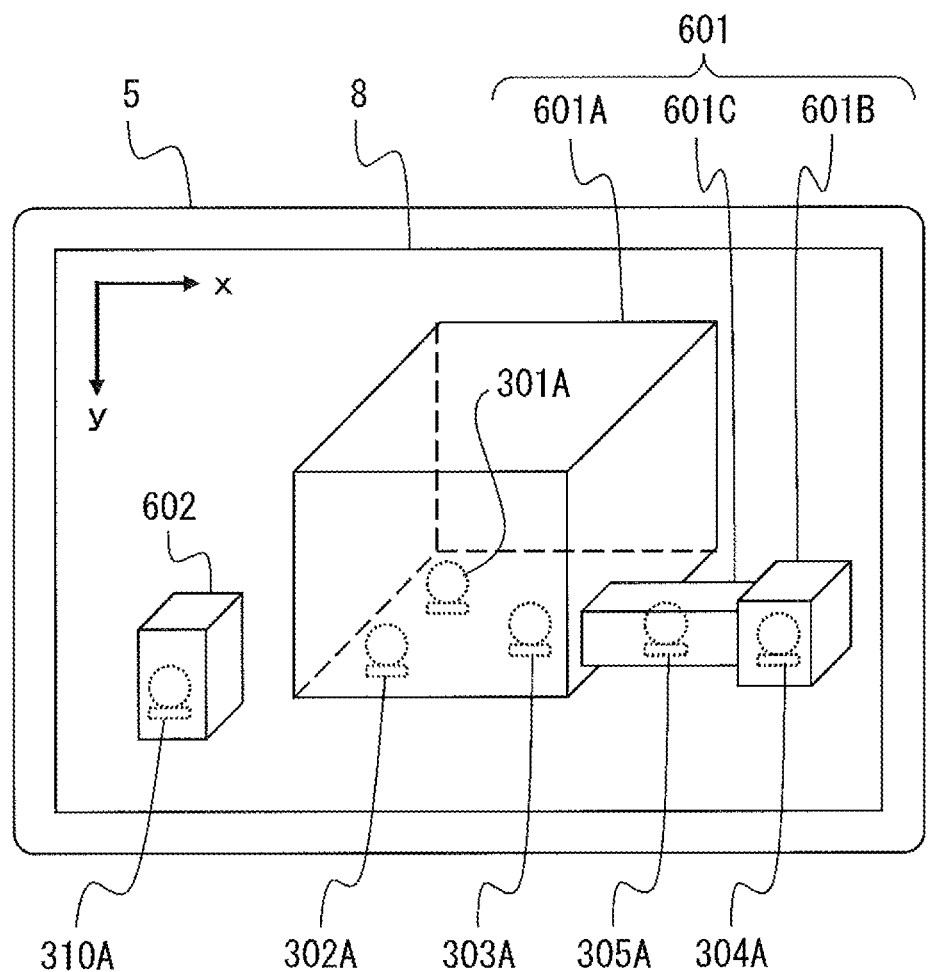
FIG. 3 illustrates an example of an image displayed on a display device of the inspection terminal.

FIG. 3 illustrates an example of an image displayed on a display device of the inspection terminal.

The display device 8 of the inspection terminal 5 displays an image captured by the image capturing device 2. In the case of the inspection system 1A illustrated in FIG. 1, the display device 8 displays an image of an area in which two pieces of equipment 601 and 602 are arranged as illustrated in FIG. 3. To the equipment 601 and 602 displayed on the display device 8, the compound sensors 3 having sound pickup devices are attached. One compound sensor 3 may be connected to one piece of equipment as in the case of the equipment 602 or a plurality of compound sensors 3 may be connected as in the case of the equipment 601. The equipment 601 includes a first portion 601A, a second portion 601B and a third portion 601C. In the equipment 601, a workpiece that received a prescribed process in the first portion 601A for example is conveyed to the second portion 601B via the third portion 601C. Three compound sensors (sound pickup devices 301A through 303A) are attached to the first portion 601A of the equipment 601. Also, one compound sensor (sound pickup device 304A or 305A) is connected to each of the second portion 601B and the third portion 601C. The setting positions of these sensors are registered in the sensor position information.

Figure 4:
FIG. 4 illustrates an example of sensor position information.

FIG. 4 illustrates an example of sensor position information.

As illustrated in FIG. 4, sensor position information 410 according to the present embodiment includes for example a two-dimensional coordinate value representing the position of a compound sensor in an image (in a window of a display device) and an identifier (sensor ID) for identifying a piece of equipment in which a compound sensor is set. A coordinate value representing the position of a compound sensor is calculated from for example a positional relationship between an image capturing device for capturing an image and a piece of equipment, the direction of the optical axis of an image capturing device, a view angle (image-capturing scope) and the position of a compound sensor in the equipment.

Figure 5:
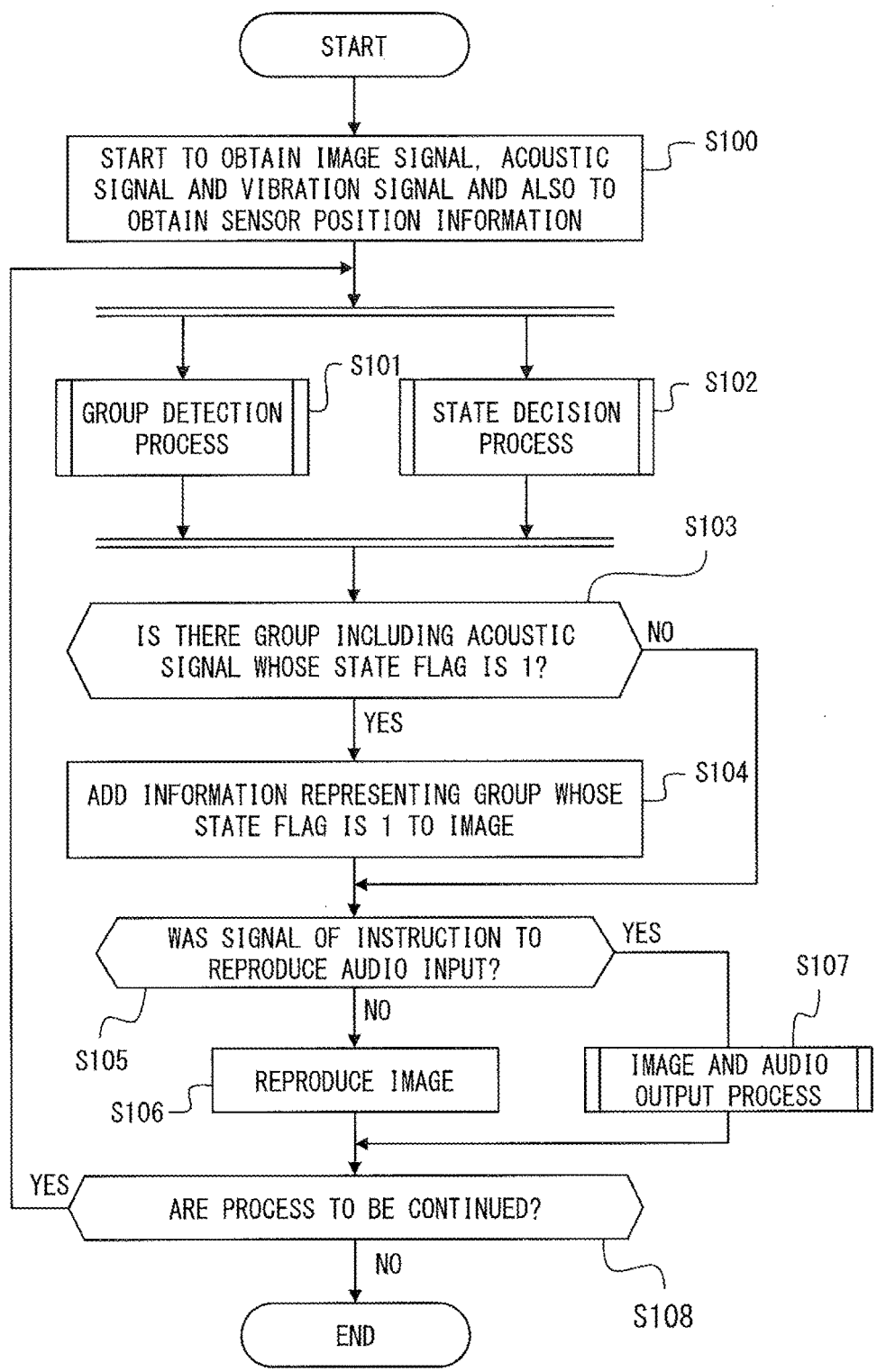
FIG. 5 is a flowchart explaining contents of a reproduction process performed by an image and audio reproduction device according to the first embodiment.

FIG. 5 is a flowchart explaining contents of a reproduction process performed by an image and audio reproduction device according to the first embodiment.

In the inspection system 1A according to the present embodiment, when for example the operator manipulates the input device 10 of the inspection terminal 5 so that the inspection terminal 5 and the relay device 4 are connected in such a manner that communications are possible, the image and audio reproduction device 7A of the inspection terminal 5 performs a reproduction process as illustrated in FIG. 5.

First, the image and audio reproduction device 7A starts to obtain an image signal, an acoustic signal and a vibration signal and also obtains sensor position information (step S100). The process in step S100 is performed by the communication unit 701.

Next, the image and audio reproduction device 7A performs a group detection process (step S101) and a state decision process (step S102). The group detection process in step S101 is performed by the correlation value calculation unit 702 and the group setting unit 703. The correlation value calculation unit 702 calculates a correlation value between acoustic signals of adjacent compound sensors (sound pickup devices) on the basis of the acoustic signals and sensor position information from the respective compound sensors. The group setting unit 703 determines whether or not the correlation value between the acoustic signals calculated by the correlation value calculation unit 702 is higher than a prescribed correlation value, and conducts grouping in which compound sensors with a high correlation (degrees of similarity) of the acoustic signals are set as one group.

The state decision process in step S102 is performed by the acoustic-characteristic amount calculation unit 704, the vibration-characteristic amount calculation unit 705 and the state decision unit 706. The acoustic-characteristic amount calculation unit 704 calculates the amounts of characteristics in acoustic signals obtained from the respective compound sensors. The vibration-characteristic amount calculation unit 705 calculates the amounts of characteristics in vibration signals obtained from the respective compound sensors. For each compound sensor, the state decision unit 706 decides whether or not an acoustic signal is normal on the basis of the amounts of characteristics of the acoustic signal and the vibration signal. Note that in the present embodiment, the state decision unit 706 uses a value of a state flag for representing the decision result for each compound sensor. When the acoustic signal is normal, the state decision unit 706 sets zero as the value of the state flag. When the acoustic signal is not normal (when there is abnormality), the state decision unit 706 sets "1" as the value of the state flag.

Completing the group detection process and the state decision process, the image and audio reproduction device 7A determines whether or not there is a group including an acoustic signal whose state flag is 1 (step S103). The determination in step S103 is performed by the reproduction unit 707. When there is a group including an acoustic signal with a state flag of 1, (Yes in step S103), the reproduction unit 707 adds, to the image (window), information representing a group that includes an acoustic signal with a state flag of 1 (step S104). Thereafter, the reproduction unit 707 checks whether or not a signal of an instruction to reproduce an acoustic signal has been input (step S105). When there is no group including an acoustic signal with a state flag of 1 (No in step S103), the reproduction unit 707 skips the process in step S104, and performs the check in step S105.

When it is determined in step S105 that a signal of an instruction to reproduce an acoustic signal has not been input (No in step S105), the reproduction unit 707 reproduces only the image signal and outputs it to the display device 8 (step S106). When it is determined in step S105 that a signal of an instruction to reproduce an acoustic signal has been input (Yes in step S105), the reproduction unit 707 performs an image and audio output process (step S107). In step S107, the reproduction unit 707 selects an acoustic signal in accordance with the input signal so as to output the image signal to the display device 8 and output the selected acoustic signal to the speaker 9.

When the reproduction unit 707 has output an image signal or has output both an image signal and an acoustic signal, the image and audio reproduction device 7A determines whether or not to continue the processes in steps S101 through S107 (step S108). When the processes are to be continued (Yes in step S108), the image and audio reproduction device 7A performs the processes in step S101 through S187 for acoustic signals in the next process unit period. When the processes are to be terminated (No in step S108), the image and audio reproduction device 7A terminates the process of obtaining an image signal, an acoustic signal and a vibration signal, and also terminates the reproduction process, although this is omitted in the flowchart in FIG. 5.

The group detection process (step S101) in the flowchart illustrated in FIG. 5 is performed by the correlation value calculation unit 702 and the group setting unit 703 as described above. The correlation value calculation unit 702 and the group setting unit 703 perform the process illustrated in FIG. 6 as a group detection process.

Figure 6:
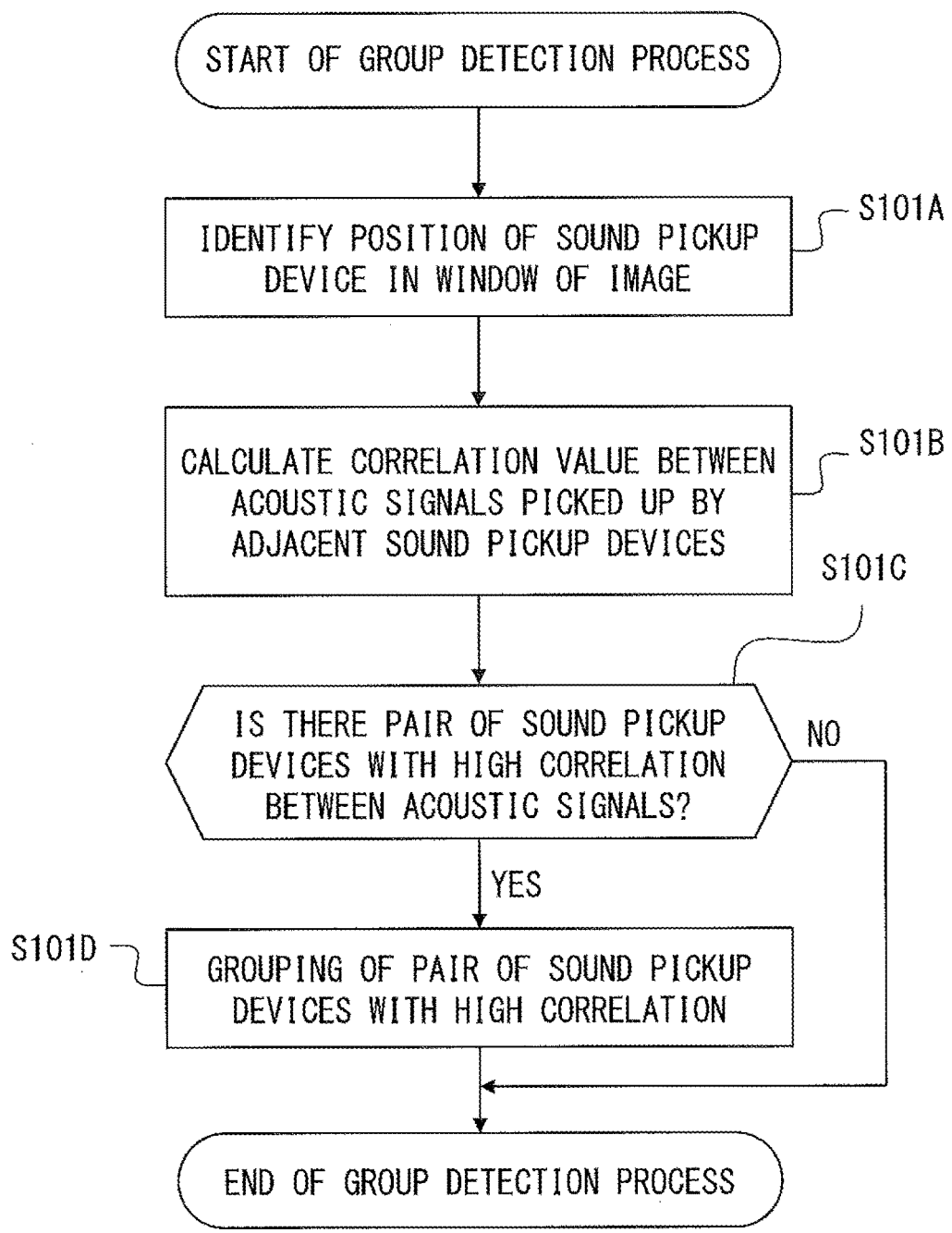
FIG. 6 illustrates a flowchart explaining contents of a group detection process performed in the reproduction process according to the first embodiment.

FIG. 6 illustrates a flowchart explaining contents of a group detection process performed in the reproduction process according to the first embodiment.

In a group detection process, the correlation value calculation unit 702 first identifies the position of a sound pickup device in the window of an image (step S101A). The correlation value calculation unit 702 identifies the position of a sound pickup device in a compound sensor on the basis of the sensor position information 410.

The correlation value calculation unit 702 next calculates a correlation value between acoustic signals of adjacent sound pickup devices (step S101B). On the basis of the sensor position information 410, the correlation value calculation unit 702 sequentially calculates correlation values between acoustic signals of pairs of adjacent sound pickup devices in the same equipment. A correlation value between acoustic signals is obtained by for example calculating a power of an acoustic signal picked up by each sound pickup device and calculating a correlation value in a time domain between powers for a pair of adjacent sound pickup devices. A correlation value in a time domain is calculated by any one of the known functions that are used for calculating a degree of similarity or a mutual correlation coefficient for acoustic signals in two time domains. After calculating correlation values for all pairs of sound pickup devices, the correlation value calculation unit 702 outputs to the group setting unit 703 the calculated correlation values and the pairs of sound pickup devices in an associated manner.

The group setting unit 703 compares each of the input correlation values with a prescribed correlation threshold so as to determine whether or not there is a pair of sound pickup devices with a high correlation between acoustic signals (step S101C). When there is a pair of sound pickup devices with a high correlation between acoustic signals (Yes in step S101C), the group setting unit 703 conducts grouping in which a pair of sound pickup devices with a high correlation are set as one group (step S101D). When one of the sound pickup devices constituting a pair has already been included in one group in step S101D, the group setting unit 703 adds the other sound pickup device to that group. When there is no pair of sound pickup devices with a high correlation between acoustic signals (No in step S101C), the group setting unit 703 skips the process in step S101D.

When the group setting unit 703 terminates the processes in steps S101C and S101D and outputs the process result to the reproduction unit 707, the group detection process for the acoustic signals in the current process unit period is terminated.

Also, the state decision process (step S102) in the flowchart illustrated in FIG. 5 is performed by the acoustic-characteristic amount calculation unit 704, the vibration-characteristic amount calculation unit 705 and the state decision unit 706 as described above. The acoustic-characteristic amount calculation unit 704, the vibration-characteristic amount calculation unit 705 and the state decision unit 706 perform the process illustrated in FIG. 7 as a state detection process.

FIG. 7 is a flowchart explaining contents of a state decision process in the reproduction process according to the present embodiment.

In the state decision process, the acoustic-characteristic amount calculation unit 704 first calculates the amount of acoustic characteristics of each acoustic signal (step S102A) and the vibration-characteristic amount calculation unit 705 calculates the amount of vibration characteristics of each vibration signal (step S102B). The acoustic-characteristic amount calculation unit 704 outputs the calculated amount of acoustic characteristics to the state decision unit 706. Also, the vibration-characteristic amount calculation unit 705 outputs the calculated amount of vibration characteristics to the state decision unit 706.

In the above situation, any amount of characteristics that permits the characterization of an acoustic signal in the current process target period and that can decide whether it is a situation with equipment operating normally or a situation involving abnormality can be used as an amount of acoustic characteristics. Similarly, any amount of characteristics that permits the characterization of a vibration signal in the current process target period and that can decide whether it is a situation with equipment operating normally or a situation involving abnormality can be used as an amount of vibration characteristics. Note that the processes in step S102A and 102B may be performed in parallel or the process in step S102B may be performed first.

In response to input of an amount of acoustic characteristics and an amount of vibration characteristics, the state decision unit 706 performs the processes in steps S102C through S102F. The state decision unit 706 first selects one acoustic signal in an undetermined state (i.e., an acoustic signal not having had its state determined) (step S102C).

Next, the state decision unit 706 determines whether or not the amount of acoustic characteristics and the amount of vibration characteristics of the selected acoustic signal are within a normal range (step S102D). In step S102D, the state decision unit 706 compares the amount of acoustic characteristics and the amount of vibration characteristics of the selected acoustic signal with an amount of acoustic characteristics and an amount of vibration characteristics that are prepared in advance, and determines whether or not the selected amount of acoustic characteristics and amount of vibration characteristics are within a normal range.

When the amount of acoustic characteristics and the amount of vibration characteristics of the selected acoustic signal are within a normal range (Yes in step S102D), the state decision unit 706 sets "0" as the state flag of the selected acoustic signal (step S102E). When the amount of acoustic characteristics or the amount of vibration characteristics of the selected acoustic signal is out of a normal range (No in step S102D), the state decision unit 706 sets "1" as the state flag of the selected acoustic signal (step S102F).

After setting a value for a state flag in step S102E or step S102F, the state decision unit 706 checks whether or not there is an acoustic signal whose state is not set (step S102G). When there is an acoustic signal whose state is not set (Yes in step S102G), the state decision unit 706 performs the processes in steps S102C through S102F for an acoustic signal whose state is not set. When the processes in step S102C through S102F have been performed on all acoustic signals (No in step S102G), the state decision unit 706 outputs a decision result to the reproduction unit 707 and terminates the state determination process for the acoustic signal in the current unit period.

After performing the group detection process and the state decision process, the reproduction unit 707 performs the processes in steps S103 through S107 described above in the image and audio reproduction device 7A.

Figure 8:
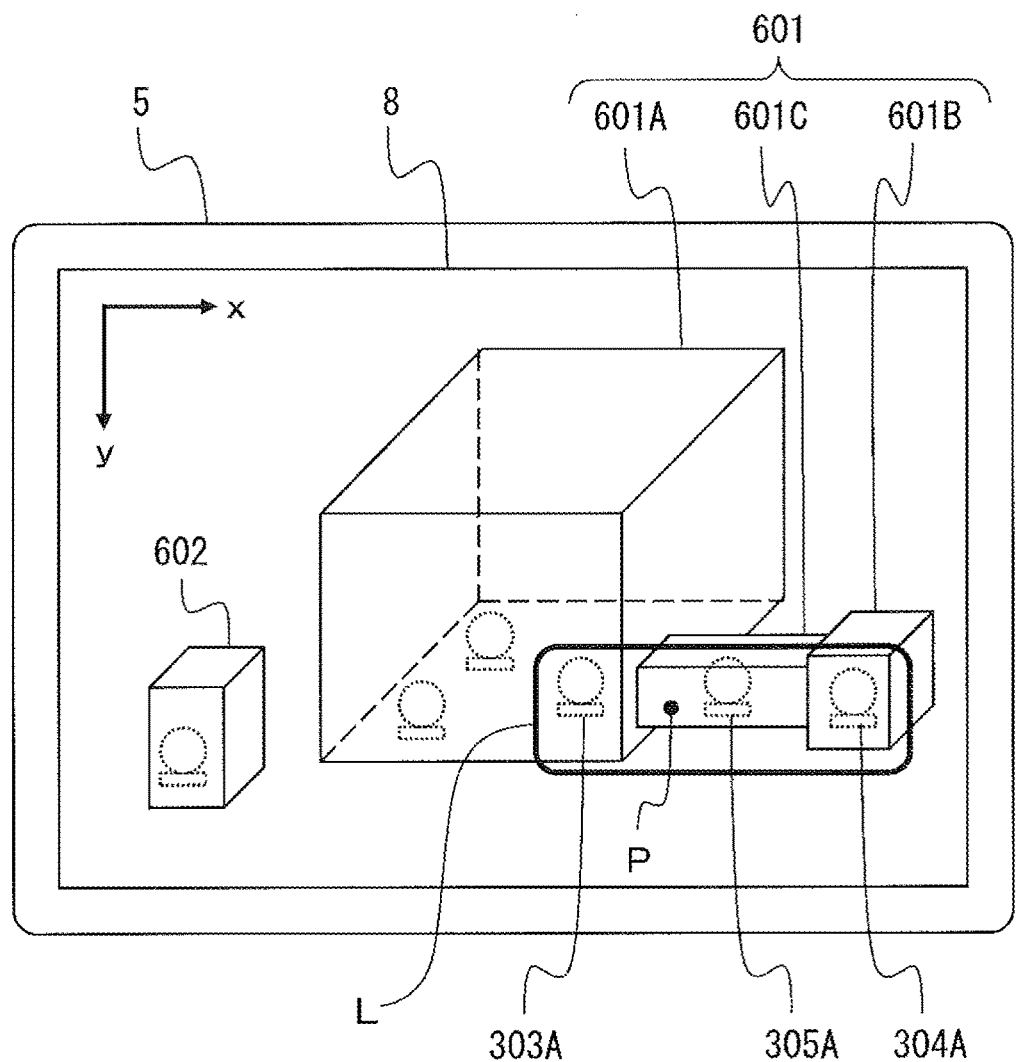
FIG. 8 illustrates an example of a process result of the reproduction process according to the first embodiment.

FIG. 8 illustrates an example of a process result of the reproduction process according to the first embodiment. FIG. 8 illustrates a process result of a case when the above reproduction process is performed as a process for reproducing the image illustrated in FIG. 3.

The display device 8 of the inspection terminal 5 is displaying two pieces of equipment 601 and 602 as an image captured by the image capturing device 2. The equipment 601, which is one of the two pieces of the equipment 601 and 602, includes the first portion 601A, the second portion 601B and the third portion 601C. In this equipment 601, a workpiece that received a prescribed process in the first portion 601A for example is conveyed to the second portion 601B via the third portion 601C. Three compound sensors are attached to the first portion 601A of the equipment 601. Also, one compound sensor (sound pickup device 304A or 305A) is connected to each of the second portion 601B and the third portion 601C. The equipment 602, which is the other one of the two pieces of equipment 601 and 602, is smaller than the equipment 601, and has for example one compound sensor (sound pickup device) attached to it.

When there is no abnormality in the equipment 601 or 602 during the reproduction of an image including the two pieces of equipment 601 and 602, the state flags become "0" for all acoustic signals in step S102. Accordingly, the image and audio reproduction device 7A skips the process in step S104 illustrated in FIG. 5. When there is no input of a signal of an instruction to reproduce an acoustic signal (No in step S105), the reproduction unit 707 outputs only an image captured by the image capturing device 2 to the display device 8. Accordingly, when there is no abnormality in the equipment 601 or 602 and there is no input of a signal of an instruction to reproduce an acoustic signal, the display device 8 of the inspection terminal 5 displays, on its window, an image captured by the image capturing device 2.

By contrast, when for example an abnormal sound is generated at point P on the conveyance path (the third portion 601C) for conveying a workpiece from the first portion 601A to the second portion 601B in the equipment 601, the sound pickup devices 303A through 305A located near the conveyance path pick up the abnormal sound. Accordingly, in the group detection process (step S101) first, three compound sensors (sound pickup devices 303A through 305A) are set as one group. Also, when the sound pickup devices 303A through 305A have picked up an abnormal sound, the state flags are set to "1" for the acoustic signals picked up by the sound pickup devices 303A through 305A in the state decision process (step S102). Accordingly, the reproduction unit 707 in the image and audio reproduction device 7A performs the process in step S104 illustrated in FIG. 5. In other words, on the basis of the sensor position information 410, the reproduction unit 707 outputs, to the display device 8, for example an image signal obtained by superimposing frame line L including the sound pickup devices 303A through 305A having picked up the abnormal sound on an image captured by the image capturing device 2. Accordingly, when the sound pickup devices 303A through 305A have picked up an abnormal sound, frame line L, which represents an area in which an abnormal sound was picked up in the image capturing scope, is displayed on the display device 8 of the inspection terminal 5 as illustrated in FIG. 8. Thereby, the operator of the inspection terminal 5 can easily recognize that an abnormal sound has been generated on the conveyance path (third portion 601C) that conveys a workpiece from the first portion 601A to the second portion 601B in the equipment 601.

Also, because a plurality of compound sensors (sound pickup devices) with a high correlation between the acoustic signals are treated as one group, the same type of an abnormal sound is picked up at the respective locations in frame line L displayed on the display device 8. This enables the operator to recognize easily what type of a sound the abnormal sound is and which of the areas in the image capturing scope the sound was detected in just by selecting one point in frame line L displayed on the display device 8 and reproducing the acoustic signal. When for example the inspection terminal 5 can be used as the input device 10 having a touch panel arranged on the display device 8, the operator of the inspection terminal 5 can hear an abnormal sound in the area just by touching a portion in frame line L by using a finger or a stylus, etc. Thereby, the operator can conduct, with less efforts, a confirmation process of identifying whether or not an abnormal sound was generated in the image capturing scope and of identifying the source of the abnormal sound, making it possible to conduct maintenance services efficiently.

Note that in a reproduction process according to the present embodiment, not only when a sensor-provided location in frame line L, representing the location at which an abnormal sound was generated, is selected, but also when a sensor-provided location out of frame line L on the window or an area near that location is selected, it is possible to confirm the sound in the selected location. In other words, in an image and audio output process (step S107) in the flowchart illustrated in FIG. 5, it is possible to output a sound at an arbitrary location on the window. The image and audio output process in step S107 is perform d by the reproduction unit 707 as described above. The reproduction unit 707 performs the process illustrated in FIG. 9 as an image and audio output process.

Figure 9:
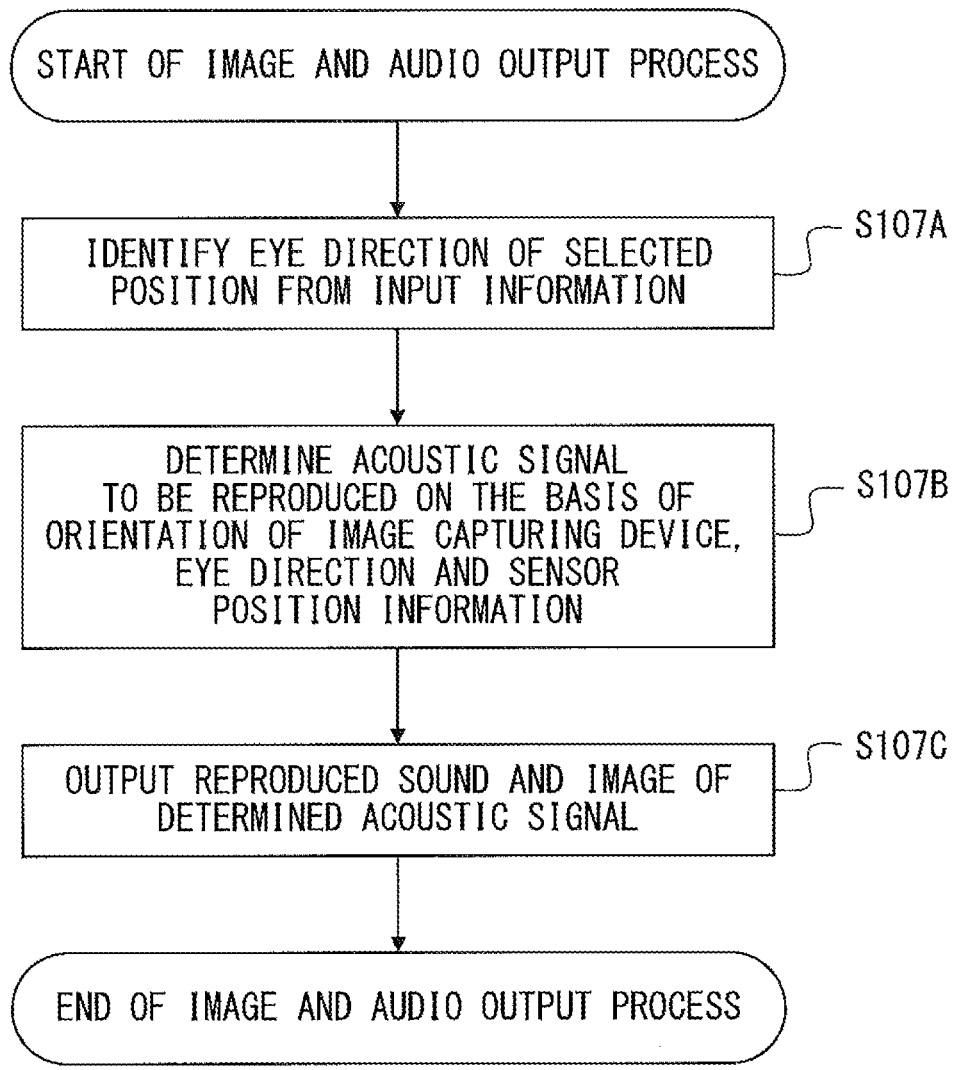
FIG. 9 is a flowchart explaining contents of an image and audio output process in the reproduction process according to the first embodiment.

FIG. 9 is a flowchart explaining contents of an image and audio output process in the reproduction process according to the first embodiment.

In the image and audio output process, the reproduction unit 707 first identifies, from input information, the eye direction at a selected position in an image (window on the display device) (step S107A). Next, the reproduction unit 707 identifies a compound sensor provided at the position closest to the selected position, on the basis of the orientation of the image capturing device, the eye direction and the sensor position information, and determines an acoustic signal to be reproduced (step S107B). Thereafter, the reproduction unit 707 outputs to the speaker 9 a sound reproduced from the acoustic signal that was determined in step S107B, and outputs the image to the display device 8 (step S107C).

As described above, according to the present embodiment, when there is a location at which an abnormal sound was picked up (detected) in an image captured by the image capturing device 2, information representing the location of the generation of the abnormal sound is added to the image and the image is displayed on the display device 8 of the inspection terminal 5. This enables the operator of the inspection terminal 5 to recognize the location of the generation of an abnormal sound easily.

Also, in a reproduction process according to the present embodiment, when adjacent locations have a high correlation of acoustic signals that were picked up at a plurality of locations in the image capturing scope, such locations are grouped. When the group includes a location of the generation of an abnormal sound, information of frame line L etc. representing the area included in that group is superimposed on the image, and the image is displayed. This permits easy recognition that the same type of an abnormal sound was picked up (detected) in the area enclosed by one frame line L in an image. Further, the operator can confirm what type of an abnormal sound is generated in an area just by selecting one location in an area enclosed by one frame line in an image and reproducing an acoustic signal. Accordingly, the present embodiment enables the operator to confirm the presence or absence of an abnormal sound in the image capturing scope of the image capturing device 2 and identify the location of the generation of an abnormal sound with less efforts.

Note that the inspection terminal 5 of the present embodiment is not limited to an integrated device including the image and audio reproduction device 7A, the display device 8, the speaker 9 and the input device 10. The inspection terminal 5 may employ a configuration in which the display device 8, the ee9 and the input device 10 that are prepared separately from the image and audio reproduction device 7A are connected to the image and audio reproduction device 7A via a transmission cable.

When the inspection terminal 5 is used for performing an inspection operations, the connection between the relay device 4 and the image and audio reproduction device 7A is not limited to the above wireless communications but may be through a transmission cable.

Further, in the above embodiment, the state of an acoustic signal is decided (decision of whether or not it is normal) on the basis of a amount of acoustic characteristics and an amount of vibration characteristics, however, the state of an acoustic signal may be decided on the basis of an amount of acoustic characteristics alone. Also, the state of an acoustic signal may be decided on the basis of a combination of an amount of acoustic characteristics and a physical amount (such as a temperature etc.) that varies between a normal state and an abnormal state in monitoring-target equipment.

Second Embodiment

Figure 10:
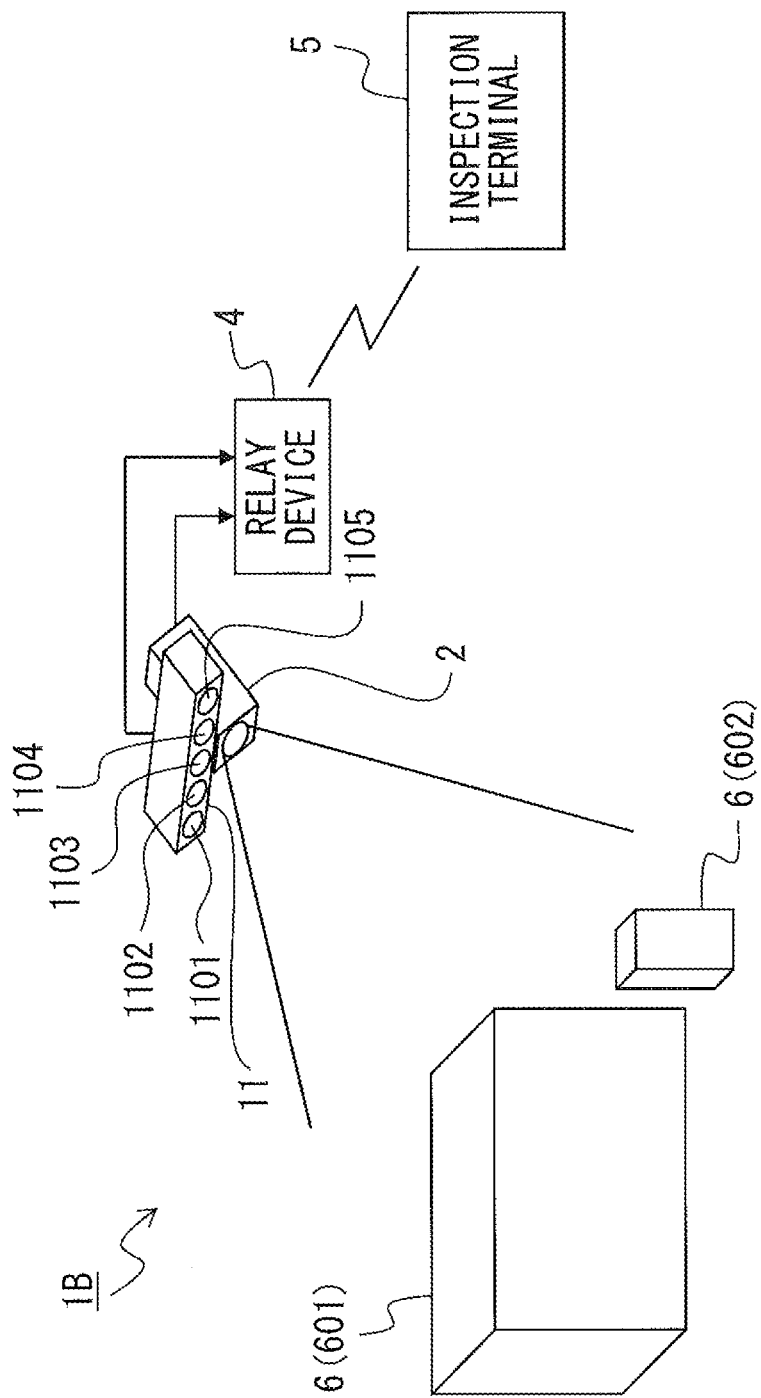
FIG. 10 illustrates a configuration example of an inspection system according to a second embodiment.

FIG. 10 illustrates a configuration example of an inspection system according to a second embodiment.

As illustrated in FIG. 10, an input system 1B according to the present embodiment includes the image capturing device 2, a microphone array 11, the relay device 4 and the inspection terminal 5.

The image capturing device 2 is a device that captures images of the equipment 6 (601 and 602) that are inspection targets.

The microphone array 11 is a device in which a plurality of sound pickup devices (microphones) are arrayed. The microphone array 11 illustrated in FIG. 10 includes five sound pickup devices 1101 through 1105 that are arranged in line at prescribed intervals. As illustrated in FIG. 10, this microphone array 11 is located near the image capturing device 2 and is oriented in a direction of picking up a sound arriving from the image capturing scope (equipment 6).

The relay device 4 is a device that obtains an image captured by the image capturing device 2 and an acoustic signal output from the microphone array 11 (sound pickup devices 1101 through 1105) so as to transfer them to the inspection terminal 5. The inspection terminal 5 is a device that reproduces an image and an acoustic signal obtained via the relay device 4. The relay device 4 and the inspection terminal 5 are connected to each other by for example wireless communications based on a prescribed wireless communication standard.

Figure 11:
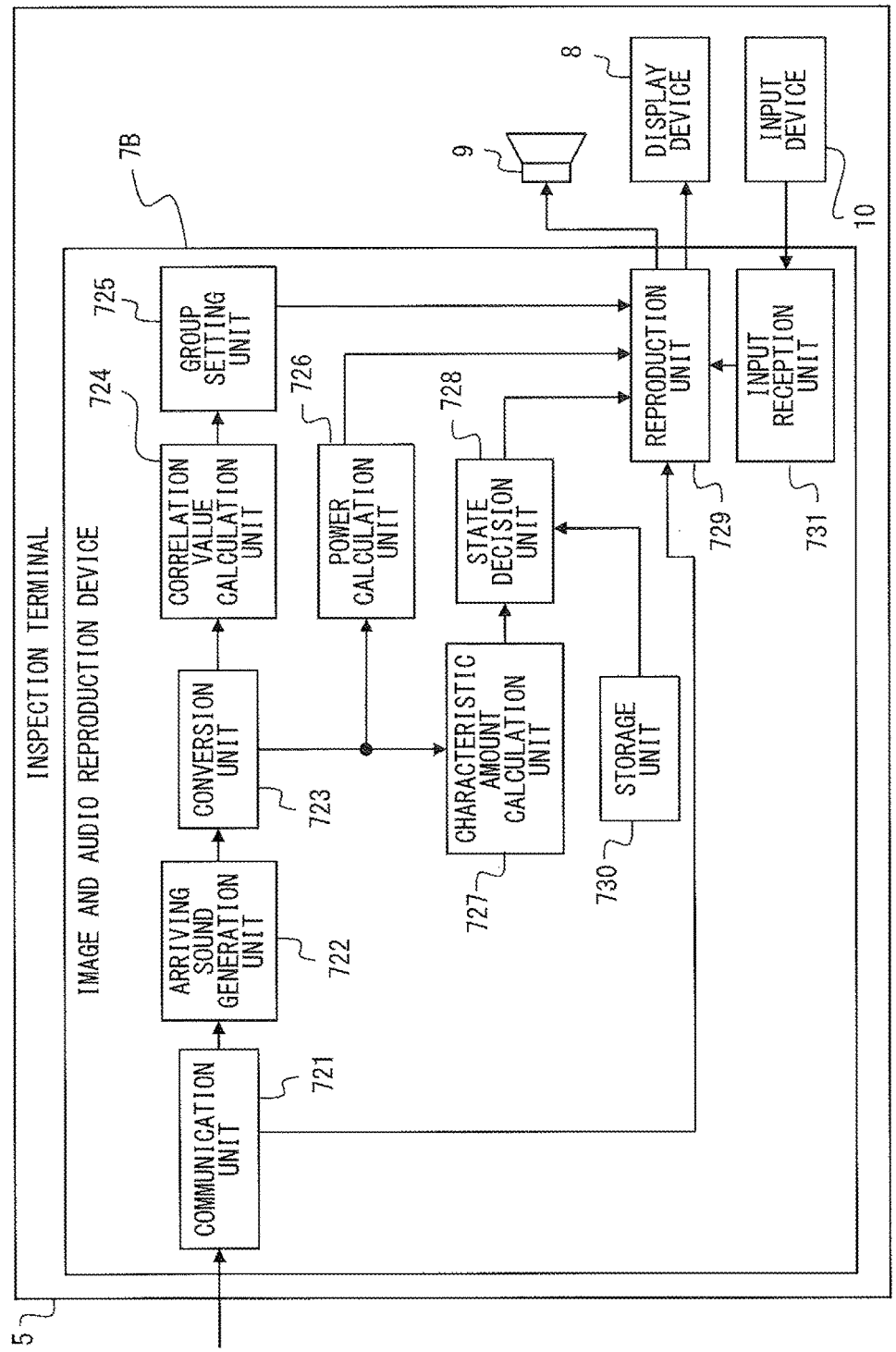
FIG. 11 is a block diagram illustrating a functional configuration of an inspection terminal used in the inspection system according to the second embodiment.

FIG. 11 is a block diagram illustrating a functional configuration of an inspection terminal used in the inspection system according to the second embodiment.

As illustrated in FIG. 11, the inspection terminal 5 according to the present embodiment includes an image and audio reproduction device 7B, the display device 8, the speaker 9 and the input device 10.

The image and audio reproduction device 7B includes a communication unit 721, an arriving sound generation unit 722, a conversion unit 723, a correlation value calculation unit 724 and a group setting unit 725. Also, the image and audio reproduction device 7B includes a power calculation unit 726, a characteristic amount calculation unit 727, a state decision unit 728, a reproduction unit 729, a storage unit 730 and an input reception unit 731.

The communication unit 721 conducts a wireless communication with the relay device 4, and obtains an image captured by the image capturing device 2 and a plurality of acoustic signals output from the microphone array 11. The communication unit 721 outputs an obtained image to the reproduction unit 729. Also, the communication unit 721 outputs an obtained acoustic signal to the arriving sound generation unit 722.

On the basis of a plurality of acoustic signals obtained from the microphone array 11, the arriving sound generation unit 722 generates acoustic signals that arrive at the microphone array 11 (image capturing device 2) respectively from a plurality of locations in an obtained image. The arriving sound generation unit 722 outputs a generated acoustic signal (arriving sound) to the conversion unit 723.

The conversion unit 723 converts an acoustic signal (arriving sound) generated by the arriving sound generation unit 722 into a signal in a frequency domain (frequency spectrum) from a signal in a time domain. The conversion unit 723 outputs an acoustic signal in a frequency domain obtained by the conversion to the correlation value calculation unit 724, the power calculation unit 726 and the characteristic amount calculation unit 727.

The correlation value calculation unit 724 uses a plurality of input acoustic signals so as to calculate a correlation value between acoustic signals that arrived from adjacent directions. The group setting unit 725 compares a calculated correlation value between acoustic signals with a prescribed correlation threshold and determines the presence or absence of a correlation between acoustic signals. Also, on the basis of a result of the determination of the presence or absence of a correlation between acoustic signals, the group setting unit 725 conducts grouping in which a pair of arrival directions of acoustic signals with a correlation is set as a one group. The group setting unit 725 outputs information on a set group to the reproduction unit 729.

The power calculation unit 726 calculates powers of a plurality of input acoustic signals. The power calculation unit 726 outputs the calculated power of each acoustic signal to the reproduction unit 729.

The characteristic amount calculation unit 727 analyzes a plurality of input acoustic signals so as to calculate a prescribed amount of acoustic characteristics. The characteristic amount calculation unit 727 outputs the calculated amount of acoustic characteristics to the state decision unit 728. The state decision unit 728 compares the amount of acoustic characteristics calculated by the characteristic amount calculation unit 727 with an amount of acoustic characteristics in a normal condition stored in the storage unit 730, and decides whether or not the acoustic signal (arriving sound) in each arrival direction is normal. The state decision unit 728 outputs the decision result to the reproduction unit 729.

On the basis of the decision result by the state decision unit 728 and the power of each acoustic signal, the reproduction unit 729 determines whether or not the signal is decided to be not normal and there is an acoustic signal having a power equal to or greater than a threshold. When there is a corresponding acoustic signal, the reproduction unit 729 outputs, to the display device 8, information representing the source of an abnormal acoustic signal on the image together with the image. When there is an acoustic signal decided to be not normal, the reproduction unit 729 outputs, to the display device, information representing a group including an arrival direction including the abnormality among the groups set by the group setting unit 725 together with the image. Note that when there is no acoustic signal decided to be not normal, the reproduction unit 729 outputs only an input image to the display device 8.

Further, the reproduction unit 729 selects an acoustic signal arriving from a direction corresponding to a point specified by the operator in the image, and outputs it to the speaker 9. The operator manipulates the input device 10 so as to specify the point in the image. In response to a manipulation of the input device 10 by the operator, an input signal in accordance with the manipulation content is input to the input reception unit 731 of the image and audio reproduction device 7B from the input device 10. The input reception unit 731 outputs an input signal to the reproduction unit 729 when the input signal is a signal related to the reproduction of an acoustic signal.

Figure 12:
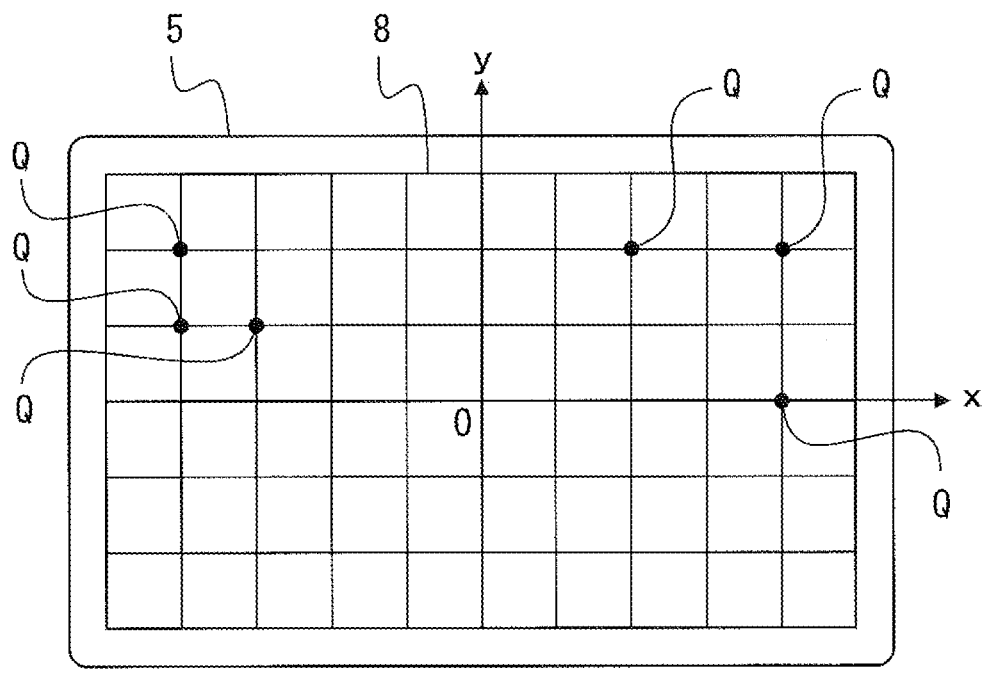
FIG. 12 explains a method of setting an arrival direction of an arriving sound generated by an arriving sound generation unit.

FIG. 12 explains a method of setting an arrival direction of an arriving sound generated by an arriving sound generation unit.

The arriving sound generation unit 722 in the image and audio reproduction device 7B according to present embodiment generates a sound arriving at the microphone array 11 (sound pickup device) from each of a plurality of locations in the image as described above. In the above generation, the arriving sound generation unit 722 generates a sound arriving from a location corresponding to each grid point Q in a two-dimensional grid set in an image displayed on the display device 8 of the inspection terminal 5 as illustrated in for example FIG. 12. The intervals between grid points Q can be set arbitrarily, and are set to be for example a value appropriate to the types and arrangements of pieces of equipment existing in the inspection target area (image capturing scope).

An arriving sound from a position corresponding to each grid point Q set in an image may be generated by using a known generation method. An arriving sound from grid point Q can be generated by folding a transmission characteristic corresponding to the position of grid point Q in the image (arrival direction) into a plurality of acoustic signals picked up by the microphone array 11. An arrival direction can be calculated on the basis of a direction of an optical axis in the camera coordinate system of the image capturing device 2 and the eye direction passing through grid point Q.

Figure 13:
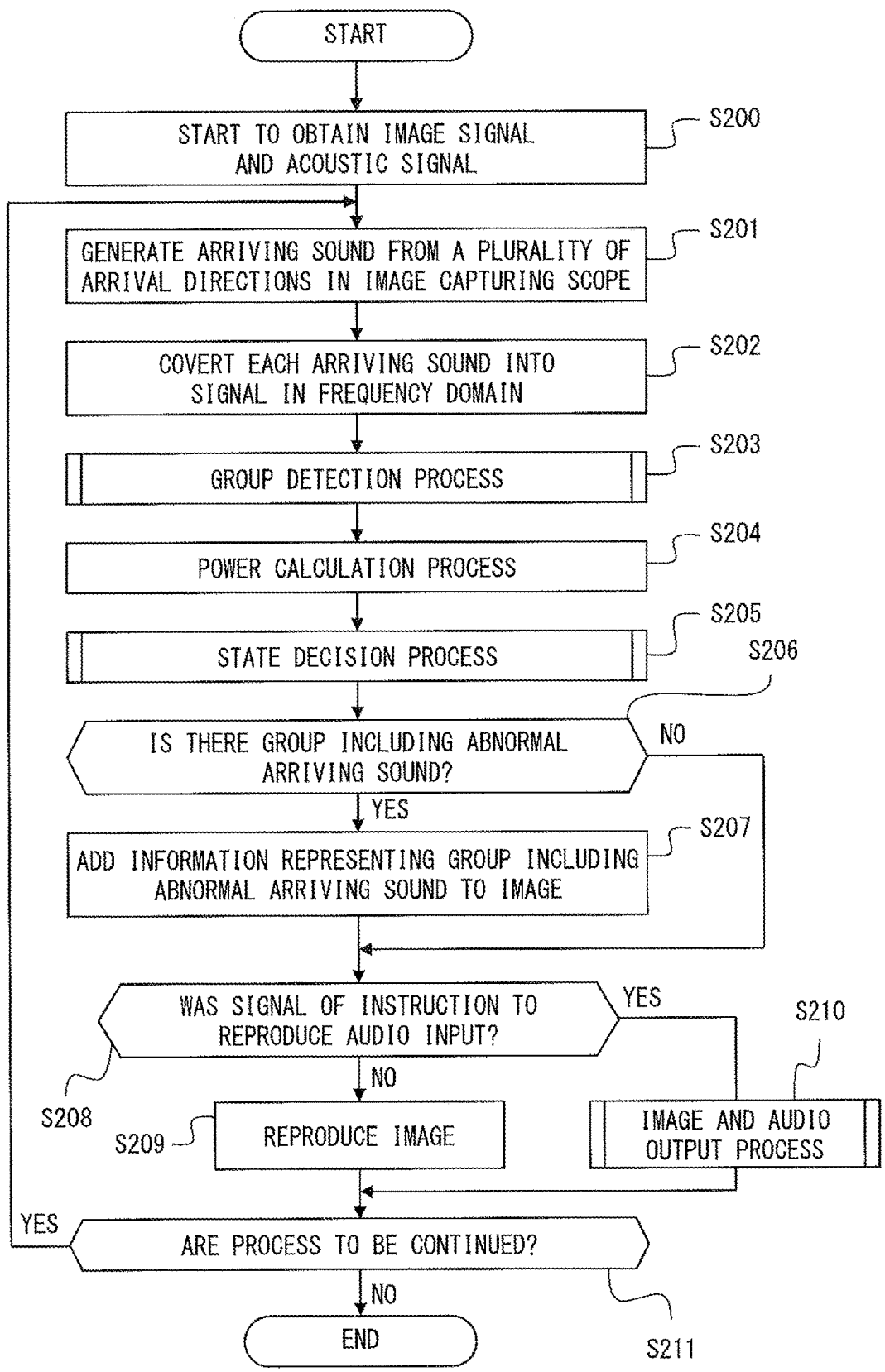
FIG. 13 is a flowchart explaining contents of a reproduction process performed by an image and audio reproduction device according to the second embodiment.

In the inspection system 1B according to present embodiment, when for example the operator manipulates the input device 10 of the inspection terminal 5 and the inspection terminal 5 and the relay device 4 are connected so as to allow communications between them, the image and audio reproduction device 7B of the inspection terminal 5 performs a reproduction process as illustrated in FIG. 13.

FIG. 13 is a flowchart explaining contents of a reproduction process performed by an image and audio reproduction device according to the second embodiment.

The image and audio reproduction device 7B first starts to obtain an image signal and an acoustic signal (step S200). The process in step S200 is performed by the communication unit 721. The communication unit 721 outputs an obtained image signal to the reproduction unit 729 and outputs an obtained acoustic signal to the arriving sound generation unit 722.

Next, the image and audio reproduction device 7B generates arriving sounds from a plurality of arrival directions in the image capturing scope (step S201). The process in step S201 is performed by the arriving sound generation unit 722. As explained by referring to FIG. 12, the arriving sound generation unit 722 treats, as arrival direction, a direction corresponding to the position of each grid point Q set on the image so as to generate an arriving sound by folding the transmission characteristic corresponding to the arrival direction into a plurality of acoustic signals. The arriving sound generation unit 722 associates the generated arriving sound with the arrival direction so as to output them to the conversion unit 723.

Next, the image and audio reproduction device 7B calculates a power spectrum for each arrival direction by converting a plurality of generated arriving sounds from signals in a time domain into signals in a frequency domain (frequency spectrum) (step S202). The process in step S202 is performed by the conversion unit 723. The conversion unit 723 performs Fast Fourier Transform (FFT) on each of the plurality of arriving sounds so as to convert each arriving sound into a frequency spectrum. The conversion unit 723 outputs the calculated power spectrum to the correlation value calculation unit 724, the power calculation unit 726 and the characteristic amount calculation unit 727.

Next, the image and audio reproduction device 7B performs a group detection process (step S203), a power calculation process (step S204) and a state decision process (step S205). Note that the order of the processes in steps S203, S204 and S205 is not limited to the order illustrated in FIG. 13, and these processes may be performed in different orders or may be executed in parallel.

The group detection process in step S203 is performed by the correlation value calculation unit 724 and the group setting unit 725. On the basis of the power spectrum for each arrival direction, the correlation value calculation unit 724 calculates a correlation value between power spectrums in adjacent arrival directions. In this example, adjacent arrival directions refer to two arrival directions that correspond to two grind points Q that are adjacent in the horizontal directions or in the vertical directions on the window among the plurality of grind points Q illustrated in FIG. 12. The correlation value calculation unit 724 calculates, as a correlation value, for example a mutual correlation coefficient for a power spectrum in a frequency domain. The correlation value calculation unit 724 associates a calculated correlation value with a pair of arrival directions (grind points Q) so as to output them to the group setting unit 725.

The group setting unit 725 compares each of the input correlation values with a prescribed correlation threshold, and sets a pair of arrival directions with a high correlation as one group when there is a pair of arrival directions with a high correlation between acoustic signals. When one of the arrival directions constituting a pair has already been included in one group, the group setting unit 725 adds the other arrival direction to that group. Completing the setting of a group of arrival directions with high correlations, the group setting unit 725 outputs information regarding the set group to the reproduction unit 729.

The power calculation process in step S204 is performed by the power calculation unit 726. The power calculation unit 726 uses the power spectrum for each arrival direction so as to calculate the power of an arriving sound for each arrival direction. The power calculation unit 726 outputs a calculated power for each arrival direction to the reproduction unit 729.

The state decision process in step S205 is performed by the characteristic amount calculation unit 727 and the state decision unit 728. The characteristic amount calculation unit 727 calculates the amount of characteristics of the power spectrum of each arrival direction, and outputs the calculated amount of characteristics to the state decision unit 728. The state decision unit 728 compares, for each arrival direction, the calculated amount of characteristics of the power spectrum with a prescribed amount of characteristics of a power spectrum in a normal condition, and decides whether or not the arriving sound is normal. The state decision unit 728 reads the amount of characteristics of the power spectrum in a normal condition from the storage unit 730. In a state decision process according to present embodiment, similarly to a state decision process according to the first embodiment, the state flag of a normal arriving sound (power spectrum) is set to "0" and the state flag of a arriving sound (power spectrum) that is not normal is set to "1". The state decision unit 728 outputs a state flag representing the state of a power spectrum to the reproduction unit 729.

Completing a group detection process, a power calculation process and a state decision process, the image and audio reproduction device 7B determines whether or not there is a group including an abnormal arriving sound (step S206). The determination in step S206 is performed by the reproduction unit 729. When there is a group that includes an arriving sound with the state flag of "1" and that has a power equal to or greater than a prescribed threshold, the reproduction unit 729 determines that group to be a group including an abnormal arriving sound. When there is a group including an abnormal arriving sound (Yes in step S206), the reproduction unit 729 adds information representing the arrival direction of an arriving sound included in that group to the image (window) (step S207). Thereafter, the reproduction unit 729 checks whether or not a signal of an instruction to reproduce an acoustic signal has been input (step S208). When there is no group including an abnormal arriving sound (No in step S206), the reproduction unit 729 skips the process in step S207, and performs the check in step S208.

When it is determined in step S208 that a signal of an instruction to reproduce an acoustic signal has not been input (No in step S208), the reproduction unit 729 reproduces only the image signal and outputs it to the display device 8 (step S209). When it is determined in step S208 that a signal of an instruction to reproduce an acoustic signal has been input (Yes in step S208), the reproduction unit 729 performs an image and audio output process (step S210). In step S210, the reproduction unit 729 selects an acoustic signal in an arrival direction specified by the input signal so as to output the image signal to the display device 8 and outputs the selected acoustic signal to the speaker 9.

When the reproduction unit 729 has output an image signal or has output both an image signal and an acoustic signal, the image and audio reproduction device 7B determines whether or not to continue the processes in steps S201 through S210 (step S211). When the processes are to be continued (Yes in step S211), the image and audio reproduction device 7B performs the processes in step S201 through S210 for acoustic signals in the next process unit period. When the processes are to be terminated (No in step S211), the image and audio reproduction device 7B terminates the process of obtaining an image signal and an acoustic signal, and also terminates the reproduction process, although this is omitted in the flowchart in FIG. 13.

The group detection process (step S203) in the flowchart illustrated in FIG. 13 is performed by the correlation value calculation unit 724 and the group setting unit 725 as described above. The correlation value calculation unit 724 and the group setting unit 725 perform the process illustrated in FIG. 14 as a group detection process.

Figure 14:
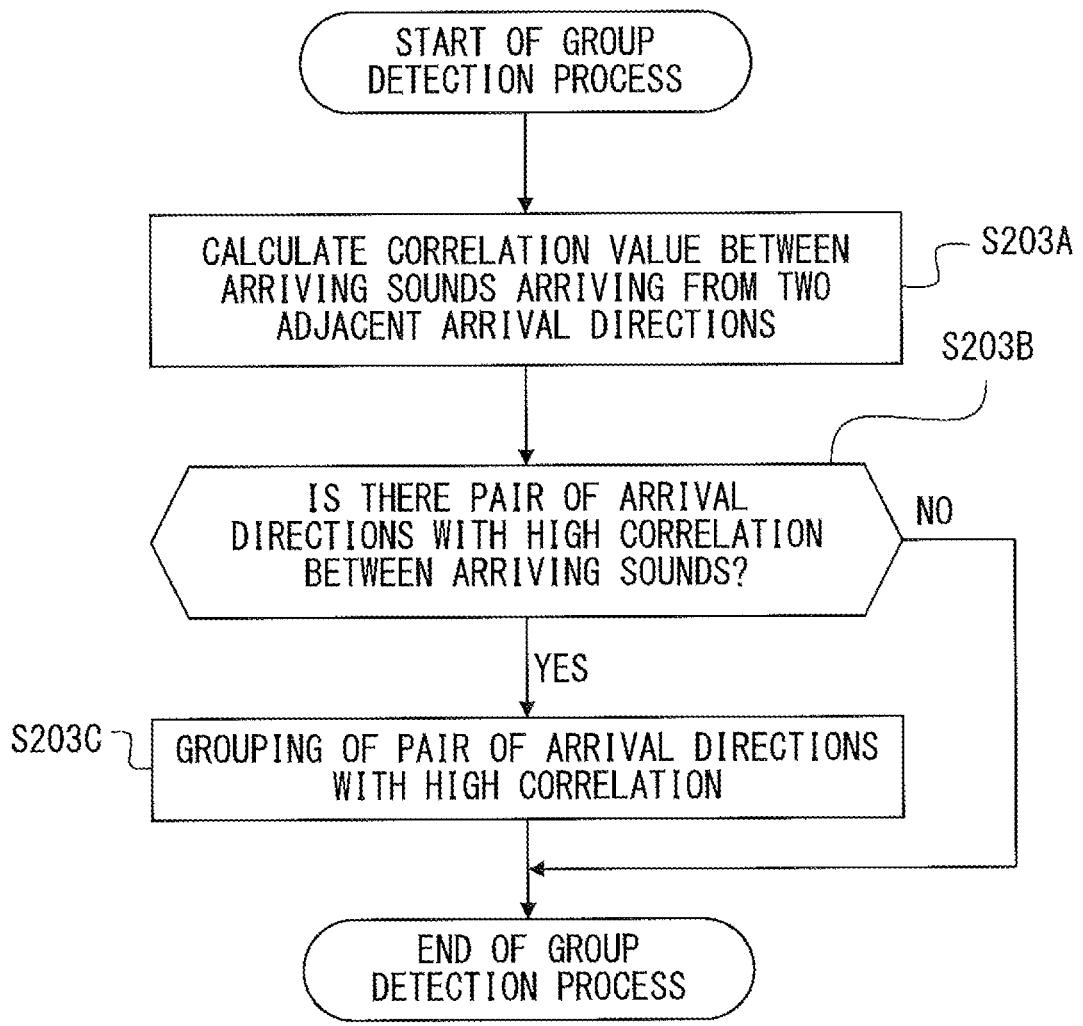
FIG. 14 illustrates a flowchart explaining contents of a group detection process performed in the reproduction process according to the second embodiment.

FIG. 14 illustrates a flowchart explaining contents of a group detection process performed in the reproduction process according to the second embodiment.

In a group detection process according to the present embodiment, the correlation value calculation unit 724 first calculates a correlation value of arriving sounds arriving from two adjacent arrival directions (step S203A). In step S203A, the correlation value calculation unit 724 performs, on all pairs of arrival directions that can be selected, a process in which two arrival directions are selected from among a plurality of arrival directions set in the image and a correlation value is calculated for the pair of the two selected arrival directions. The correlation value calculation unit 724 associates a calculated correlation value with the pair of the arrival directions and outputs them to the group setting unit 725.

Next, the group setting unit 725 compares a correlation value calculated by the correlation value calculation unit 724 with a prescribed correlation value so as to determine whether or not there is a pair of arrival directions with a high correlation of arriving sounds (step S203B). When there is a pair of arrival directions with a high correlation of arrival sounds (Yes in step S203B), the group setting unit 725 sets a pair of arrival directions with a high correlation into one group (step S203C). When one of the arrival directions constituting a pair of arrival directions has already been included in one group in step S203C, the group setting unit 725 adds the other arrival direction to that group. When there is no pair of arrival directions with a high correlation of arriving sounds (No in step S203B), the group setting unit 725 skips the process in step S203C.

When the group setting unit 725 terminates the processes in steps S203B and S203C and outputs the process result to the reproduction unit 729, the group detection process for the acoustic signals in the current process unit period is terminated.

Also, the state decision process (step S205) in the flowchart illustrated in FIG. 13 is performed by the characteristic amount calculation unit 727 and the state decision unit 728 as described above. The characteristic amount calculation unit 727 and the state decision unit 728 perform the process illustrated in FIG. 15 as a state detection process.

Figure 15:
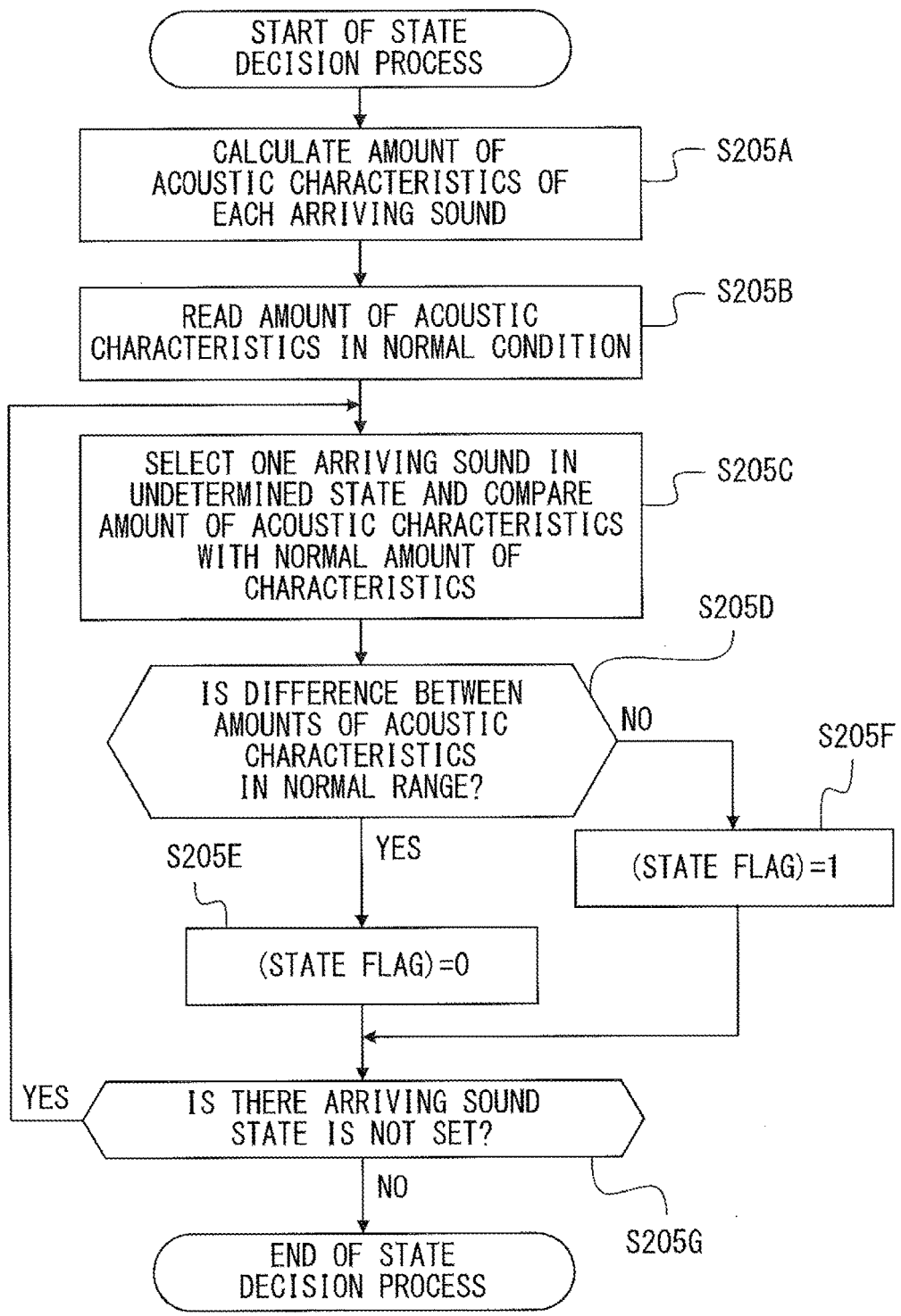
FIG. 15 is a flowchart explaining contents of a state decision process in the reproduction process according to the second embodiment.

FIG. 15 is a flowchart explaining contents of a state decision process in the reproduction process according to the second embodiment.

In the state decision process, first, the characteristic amount calculation unit 727 calculates the amount of acoustic characteristics of an acoustic signal converted into a frequency spectrum (step S205A). The characteristic amount calculation unit 727 outputs the calculate amount of acoustic characteristics to the state decision unit 728. In the above situation, any amount of characteristics that permits the characterization of an arriving sound in the current process target period and that can decide whether it is a situation with equipment operating normally or a situation involving abnormality can be used as an amount of acoustic characteristics.

In response to input of an amount of acoustic characteristics calculated by the characteristic amount calculation unit 727, the state decision unit 728 performs the processes in step S205B through S205F. The state decision unit 728 first reads an amount of acoustic characteristics in a normal condition from the storage unit 730 (step S205B). Next, the state decision unit 728 selects one arriving sound in an undetermined state (i.e., an arriving sound not having had its state determined) so as to compare the amount of acoustic characteristics with an amount of acoustic characteristics in a normal condition (step S205C), and determines whether or not the amount of acoustic characteristics of the selected arriving sound is within a normal range (step S205D). In step S205C and S205D, the state decision unit 728 obtains for example a difference between the selected amount of acoustic characteristics and the amount of acoustic characteristics in a normal condition so as to determine whether or not the difference is within an allowable range of a normal condition.

When a selected amount of acoustic characteristics is within a normal range (Yes in step S205D), the state decision unit 728 sets the state flag of the amount of acoustic characteristics of a selected arriving sound to "0" (step S205E). When a selected amount of acoustic characteristics is out of a normal range (No in step S205D), the state decision unit 728 sets the state flag of the amount of acoustic characteristics of a selected arriving sound to "1" (step S205F).

After setting a value of a state flag in step S205E or S205F, the state decision unit 728 checks whether or not there is an arriving sound whose state is not set (i.e., an arriving sound not having had its state flag set) (step S205G). When there is an acoustic signal whose state is not set (Yes in step S205G), the state decision unit 728 performs the processes in step S205C through S205F for an arriving sound whose state is not set. When the processes in steps S205C through S205F have been conducted for all arriving sounds (No in step S205G), the state decision unit 728 outputs the decision result to the reproduction unit 729, and terminates the state determination process of the arriving sounds in the current process unit period.

After the group detection process and the state decision process above are performed, the reproduction unit 729 in the image and audio reproduction device 7B performs the processes in steps S206 through S210. The process in step S206 through S210 may respectively be similar to those in steps S103 through S107 explained in the first embodiment.

As described above, the present embodiment uses a plurality of acoustic signals picked up by the microphone array 11 so as to generate a sound (arriving sound) arriving from a position according to a grid point set in an image. When arriving sounds from adjacent arrival directions have a high correlation, the image and audio reproduction device 7B treats such arrival directions as one group. Also, when it is decided that an arriving sound from an arrival direction included in one group involves abnormality, the image and audio reproduction device 7B adds information representing the area of that group in the image to the image and displays the image on the display device 8. This permits the operator of the inspection terminal 5 to recognize easily the location of the generation of an abnormal sound in an image.

Also, arriving sounds from a plurality of arrival directions included in one group have a high correlation of amounts of acoustic characteristics in acoustic signals converted into frequency domains. This permits the operator of the inspection terminal 5 to recognize easily that abnormal sounds of the same type have been picked up (detected) in an area enclosed by one frame, which represents the location of the generation of abnormal sounds in an image. This further enables the operator to recognize easily what type of a sound the abnormal sound is just by selecting one location in an area enclosed by one frame in an image. Accordingly, the present embodiment permits the operator to conduct, with less efforts, confirmation of the presence or absence of an abnormal sound and the identification of the location of the generation of the abnormal sound in the image capturing scope of the image capturing device 2.

Further, the present embodiment treats as an arrival direction a position corresponding to a two-dimensional grid point set in an image and determines whether or not a sound arriving from each arrival direction is normal. Thereby, the present embodiment permits the investigation of whether or not an abnormal sound has been generated with a higher degree of fineness than in the first embodiment.

Note that explanations of the above group detection process (step S203) used an example in which a correlation value is calculated between power spectrums of arriving sounds after being converted into frequency spectrums by the correlation value calculation unit 724. However, the correlation value calculation unit 724 is not limited to this example, and may for example calculate a time change amount of power spectrum in an arriving sound after being converted into a frequency spectrum so as to calculate a correlation value between time change amounts.

Third Embodiment

Figure 16:
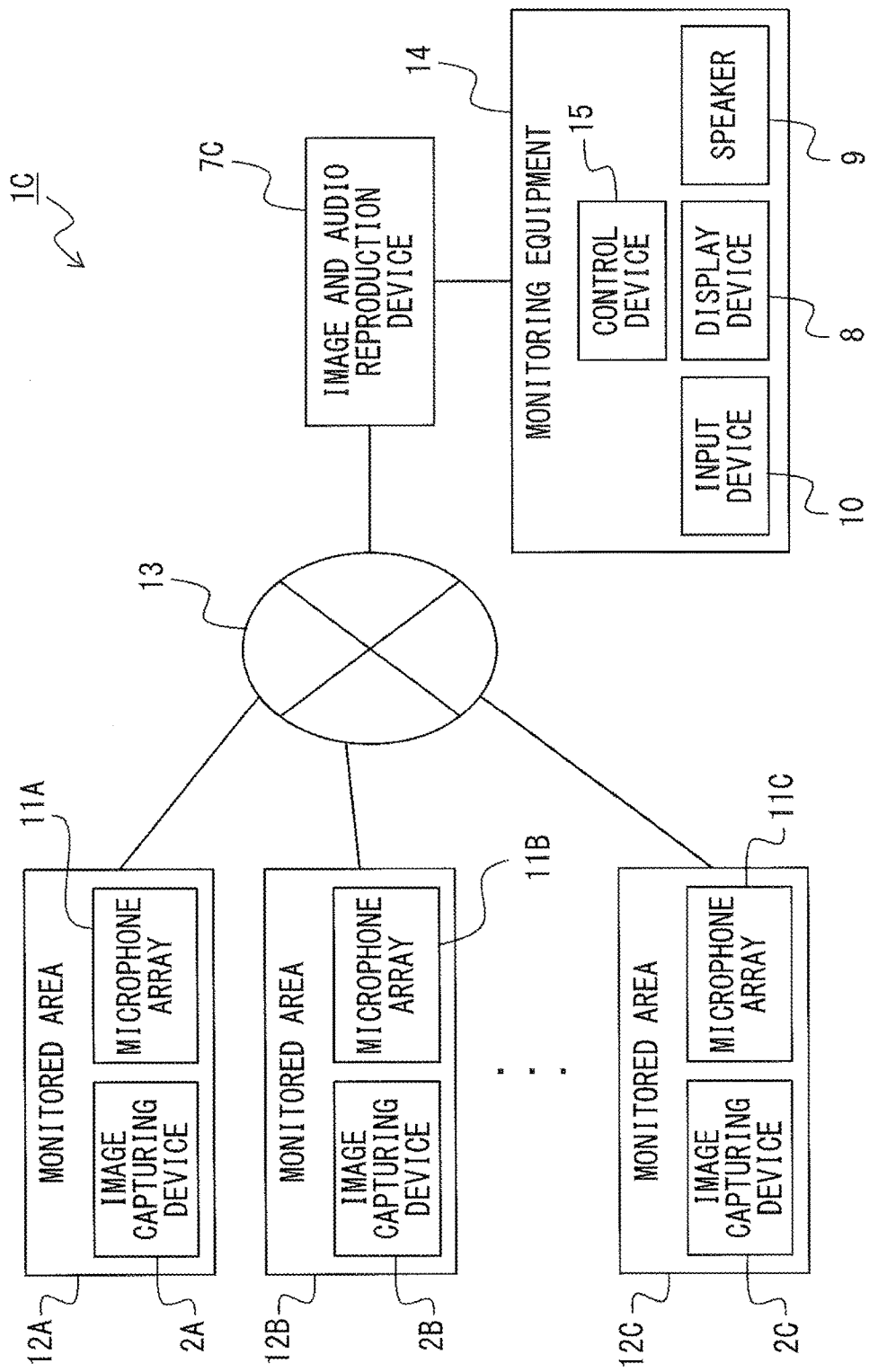
FIG. 16 illustrates a configuration example of a monitoring system according to a third embodiment.

FIG. 16 illustrates a configuration example of a monitoring system according to a third embodiment.

As illustrated in FIG. 16, a monitoring system 1C according to the present embodiment can collectively monitor a plurality of monitored areas 12A through 12C. The monitored area 12A is provided with the image capturing device 2A and the microphone array 11A. A monitored area 12B is provided with the image capturing device 2B and the microphone array 11B. The monitored area 12C is provided with the image capturing device 2C and the microphone array 11C. Images captured by image capturing devices and acoustic signals picked up by the microphone array in the monitored areas 12A through 12C are respectively transmitted to the image and audio reproduction device 7C via a communication network 13 such as the Internet etc.

The image and audio reproduction device 7C performs a reproduction process explained in the second embodiment or a process similar to a reproduction process explained in the second embodiment so as to generate information representing a location at which an abnormal sound is being generated in an image when an arriving sound involves abnormality. The image and audio reproduction device 7C transfers to monitoring equipment 14 information representing an image and an acoustic signal that were obtained and a location at which an abnormal sound is being generated.

The monitoring equipment 14 is a piece of equipment provided to a facility that displays, on the display device 8, information representing an image and an acoustic signal that were obtained and a location at which an abnormal sound is being generated, so as to monitor the monitored areas 12A through 12C. The monitoring equipment 14 includes the display device 8, the speaker 9, the input device 10 and a control device 15.

Figure 17:
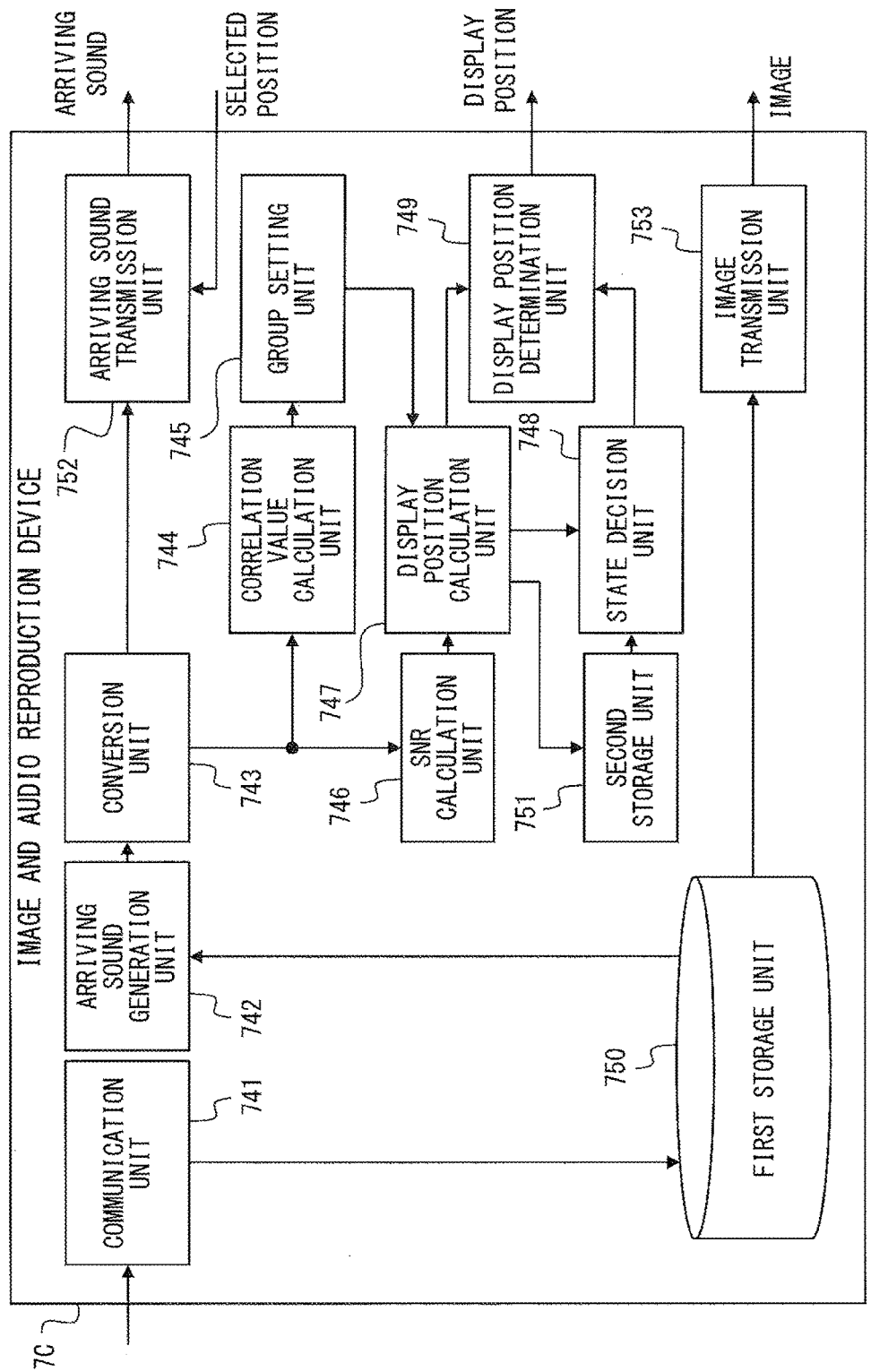
FIG. 17 is a block diagram illustrating a functional configuration of an image and audio reproduction device used in the monitoring system according to the third embodiment.

FIG. 17 is a block diagram illustrating a functional configuration of an image and audio reproduction device used in the monitoring system according to the third embodiment.

As illustrated in FIG. 17, the image and audio reproduction device 7C according to the present embodiment includes a communication unit 741, an arriving sound generation unit 742, a conversion unit 743, a correlation value calculation unit 744, a group setting unit 745, an SNR calculation unit 746 and a display position calculation unit 747. Also, the image and audio reproduction device 7C further includes a state decision unit 748, a display position determination unit 749, a first storage unit 750, a second storage unit 751, an arriving sound transmission unit 752 and an image transmission unit 753.

The communication unit 741 conducts communications with a different communication device via the communication network 13 so as to obtain an image captured by the image capturing devices 2 (2A through 2C) and a plurality of acoustic signals output from the microphone arrays 11 (11A through 11C). The communication unit 741 makes the first storage unit 750 store an obtained image and acoustic signals.

The arriving sound generation unit 742 reads a plurality of acoustic signals from the first storage unit 750 so as to generate acoustic signals arriving at the microphone array 11 from a plurality of locations in a captured image. The arriving sound generation unit 742 outputs generated acoustic signals (arriving sounds) to the conversion unit 743.

The conversion unit 743 converts the acoustic signals (arrival sounds) generated by the arriving sound generation unit 742 from signals in a time domain into signals in a frequency domain (frequency spectrums). The conversion unit 743 outputs the acoustic signals after the conversion to the correlation value calculation unit 744 and the SNR calculation unit 746.

The correlation value calculation unit 744 uses a plurality of input acoustic signals so as to calculate a correlation value between acoustic signals that are from adjacent directions. The correlation value calculation unit 744 outputs the calculated correlation value to the group setting unit 745.

The group setting unit 745 determines the presence or absence of a correlation value between acoustic signals by comparing the calculated correlation values between the acoustic signals with a prescribed correlation threshold, and conducts grouping in which adjacent arrival directions with a high correlation between acoustic signals are set as one group. The group setting unit 745 outputs information on a set group to the display position calculation unit 747.

The SNR calculation unit 746 uses a plurality of input acoustic signals (arriving sounds) so as to calculate a signal-to-noise ratio (SNR) of each arriving sound. The SNR unit outputs the calculated SNR of each arriving sound to the display position calculation unit 747.

On the basis of information of grouped arrival directions and an SNR of each arriving sound, the display position calculation unit 747 calculates a display position for superimposing information representing a group of arrival directions on an image and displaying the image. According to the present embodiment, the display position calculation unit 747 treats, as a display candidate, only a group in which the SNR calculated on the basis of the SNR of each arriving sound is equal to or higher than a prescribed threshold from among groups of arrival directions, and calculates a display position of that display candidate. The display position calculation unit 747 outputs a calculated display position to the state decision unit 748 and the display position determination unit 749 so as to make the second storage unit 751 store it.

The state decision unit 748 compares a display position calculated by the display position calculation unit 747 and a past display position stored in the second storage unit 751 regarding a group of arrival directions, and decides whether or not the state of the sound arriving from the display position is the same as that in a normal condition. The state decision unit 748 outputs a decision result to the display position determination unit 749.

On the basis of the decision result by the state decision unit 748, the display position determination unit 749 determines, to be a display position of information to be superimposed on an image, a display position of a group whose sound state was determined to be not normal among display positions of groups of arrival directions calculated by the display position calculation unit 747. The display position determination unit 749 transmits a determined display position to control device 15.

The arriving sound transmission unit 752 transmits to the control device 15 arriving sounds in a frequency domain obtained by converting acoustic signals in a time domain by using the conversion unit 743. The arriving sound transmission unit 752 selects for example an acoustic signal arriving from a direction corresponding to a point in an image specified by the operator of the monitoring equipment 14, and outputs it to the speaker 9. The operator manipulates the input device 10 of the monitoring equipment 14 so as to specify a point in an image. In response to the manipulation of the input device 10 by the operator, an input signal in accordance with the manipulation content is input to the image and audio reproduction device 7C via the control device 15.

The image transmission unit 753 transmits to the control device 15 an image signal that was from the image capturing device 2 that is stored in the first storage unit 750.

Figure 18:
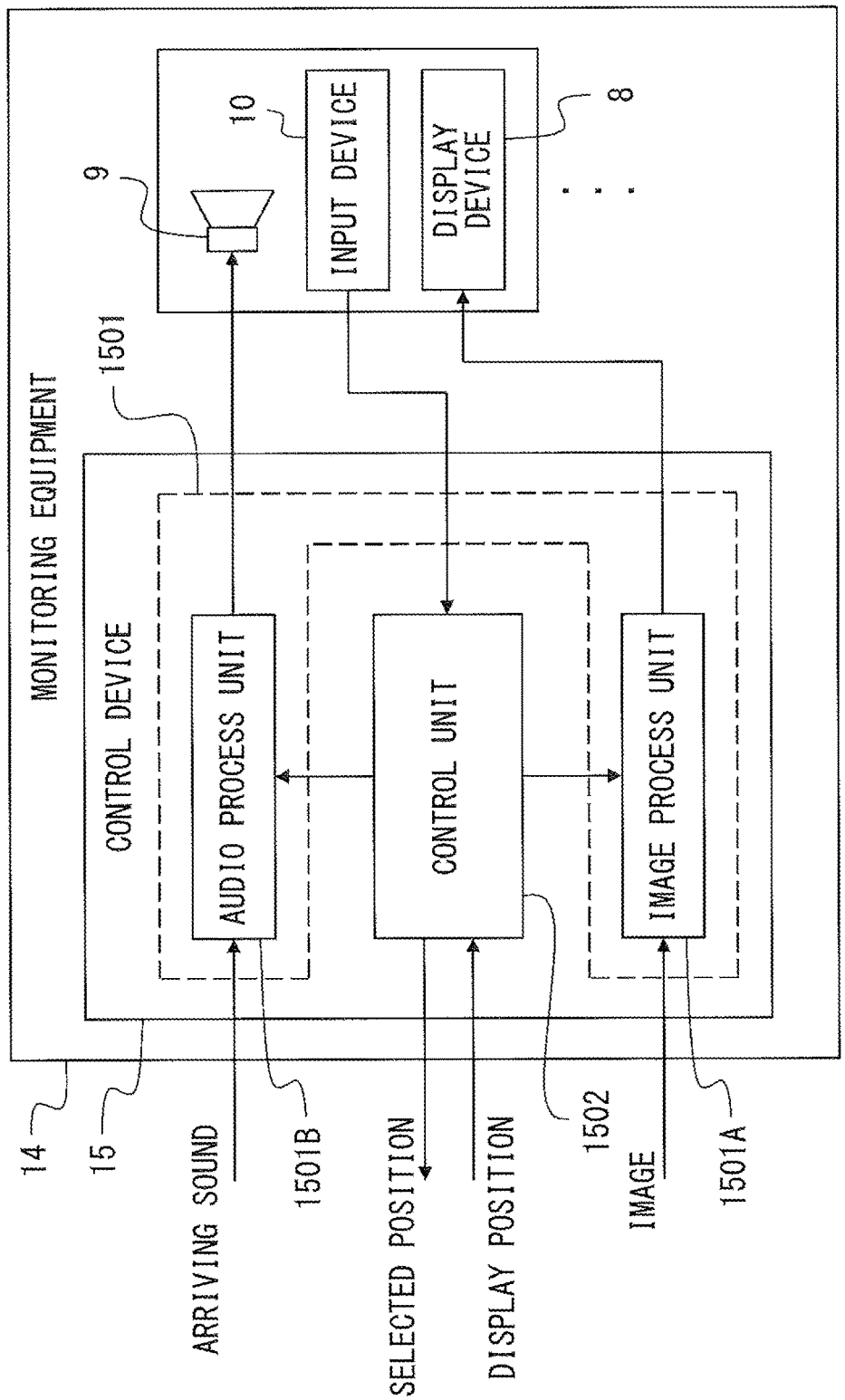
FIG. 18 is a block diagram illustrating a functional configuration of a control device used in the monitoring system according to the third embodiment.

FIG. 18 is a block diagram illustrating a functional configuration of a control device used in the monitoring system according to the third embodiment. The control device 15 of the monitoring equipment 14 includes a reproduction unit 1501 and a control unit 1502 as illustrated in FIG. 18. The reproduction unit 1501 includes an image process unit 1501A and an audio process unit 1501B.

The image process unit 1501A obtains an image signal transmitted from the image transmission unit 753 of the image and audio reproduction device 7C, converts it into a data format that allows it to be displayed on the display device 8, and outputs it to the display device 8.

The audio process unit 1501B obtains an acoustic signal transmitted by the arriving sound transmission unit 752 of the image and audio reproduction device 7C, converts it into a data format that allows it to be output from the speaker 9, i.e., into a signal in a time domain from a signal in a frequency domain (frequency spectrum), and outputs it to the speaker 9.

The control unit 1502, when receiving a display position determined by the display position determination unit 749 of the image and audio reproduction device 7C, adds information of a frame line etc. to the obtained display position in an image signal when the image process unit 1501A processes the image signal, the information representing an area in which an abnormal sound is being generated. Also, when the operator has selected a point in an area in which an abnormal sound is being generated in an image by manipulating the input device 10, the control unit 1502 transmits the selected position to the arriving sound transmission unit 752 of the image and audio reproduction device 7C. Receiving a signal representing a selected position from the control device 15, the arriving sound transmission unit 752 of the image and audio reproduction device 7C extracts an arriving sound whose arrival direction is the selected position from the arrival sound generated by the arriving sound generation unit 742 and outputs it to the audio process unit 1501B of the control device 15.

Receiving an instruction to start a reproduction process in response to for example a manipulation of the input device 10 by the operator of the monitoring equipment 14, the image and audio reproduction device 7C in the monitoring system 1C of the present embodiment performs the processes illustrated in FIG. 19.

FIG. 19 is a flowchart explaining contents of a reproduction process performed by the image and audio reproduction device according to the third embodiment. The flowchart illustrated in FIG. 19 explains a series of processes performed on an image obtained from an image capturing device arranged in one monitored area and a plurality of acoustic signals obtained from a microphone array. In other words, the image and audio reproduction device 7C performs the processes illustrated in FIG. 19 for each monitored area.

In a reproduction process according to the present embodiment, the image and audio reproduction device 7C first starts to obtain an image signal and an acoustic signal (step S300). The process in step S300 is performed by the communication unit 741. The communication unit 741 makes the first storage unit 750 store obtained image signal and acoustic signal in such a manner that they can be identified for each monitored area.

Next, the image and audio reproduction device 7C generates arriving sounds that are from a plurality of arrival directions in the image capturing scope (step S301). The process in step S301 is performed by the arriving sound generation unit 742. As explained by referring to FIG. 12, the arriving sound generation unit 742 generates arriving sounds by folding a transmission characteristic into a plurality of acoustic signals, the transmission characteristic corresponding to arrival directions that are treated as directions corresponding to respective grid points Q set in an image. The arriving sound generation unit 742 outputs the generated arriving sounds to the conversion unit 743 in a state that they are associated with the arrival directions.

Next, the image and audio reproduction device 7C calculates a power spectrum for each arrival direction by converting a plurality of generated arriving sounds from signals in a time domain into signals in a frequency domain (frequency spectrum) (step S302). The process in step S302 is performed by the conversion unit 743. The conversion unit 743 performs Fast Fourier Transform on each of the plurality of arriving sounds so as to convert each arriving sound into a signal in a frequency domain. The conversion unit 743 outputs a calculated power spectrum to the correlation value calculation unit 744 and the SNR calculation unit 746.

Next, the image and audio reproduction device 7C performs a group detection process (step S303) and a process of calculating the SNR of each signal (step S304). Note that the order of the processes in step S303 and s304 is not limited to the order illustrated in FIG. 19, and these processes may be performed in the reverse order or may be executed in parallel.

The group detection process in step S303 is performed by the correlation value calculation unit 744 and the group setting unit 745. The correlation value calculation unit 744 calculates a correlation value between power spectrums that are from arrival directions adjacent to each other, on the basis of the power spectrum for each arrival direction. The correlation value calculation unit 744 calculates for example a mutual correlation coefficient for a power spectrum in a frequency domain as a correlation value. The correlation value calculation unit 744 associates a calculated correlation value with a pair of arrival directions (grid points Q) so as to output them to the group setting unit 745.

The group setting unit 745 compares each of the input correlation values with a prescribed correlation threshold, and sets a pair of arrival directions with a high correlation as one group when there is a pair of arrival directions with a high correlation between acoustic signals. When one of the arrival directions constituting a pair has already been included in one group, the group setting unit 745 adds the other arrival direction to that group. Completing the setting of a group of arrival directions with high correlations, the group setting unit 745 outputs information regarding the set group to the display position calculation unit 747.

The process of calculating an SNR in step S304 is performed by the SNR calculation unit 746. The SNR calculation unit 746 calculates an SNR (signal-to-noise ratio) for the arriving sound for each arrival direction. The SNR calculation unit 746 outputs the calculated SNR of each arrival sound to the display position calculation unit 747.

Completing the processes in step S303 and S304, the image and audio reproduction device 7C calculates a display position on the basis of an SNR (step S305). Step S305 is performed by the display position calculation unit 747. After for example calculating the SNR of each of the groups of arrival directions on the basis of the SNR of each arriving sound, the display position calculation unit 747 calculates a display position of a case when a group in which the SNR calculated among the groups of arrival directions is higher than a prescribed threshold is superimposed on an image and the group is displayed. The display position calculation unit 747 associates a calculated display position with a group of arrival directions so as to output them to the state decision unit 748 and the display position determination unit 749, and makes the second storage unit 751 store them.

Completing the process in step S305, the image and audio reproduction device 7C performs a decision process (step S306). The decision process in step S306 is performed by the state decision unit 748. The state decision unit 748 compares a calculated display position with a past display position so as to decide whether or not a change in the display position is within a scope of changes in a normal condition. The state decision unit 748 outputs a decision result to the display position determination unit 749.

Completing the process in step S306, the display position determination unit 749 checks whether or not the change in a display position is within a normal range on the basis of the input decision result (step S307). When the change in a display position is not within a normal range (No in step S307), the display position determination unit 749 determines a display position of a group of arrival directions involving an abnormal sound and outputs the determined position to the control device 15 (step S308). Thereafter, the image and audio reproduction device 7C transmits an image signal to the control device 15 (step S309). The transmission process in step S309 is performed by the image transmission unit 753. The timing for the transmission process in step S309 is not limited to one after step S308, and may be an arbitrary timing.

When the change in a display position is within a normal condition (Yes in step S307), which means that there is no group involving an abnormal arriving sound (abnormal sound), the display position determination unit 749 skips the process in step S308. Thereafter, the image and audio reproduction device 7C transmits an image signal to the control device 15 (step S309).

After the transmission process in step S309, the image and audio reproduction device 7C determines whether or not to continue the processes in step S301 through S309 (step S310). When the processes are to be continued (Yes in step S310), the image and audio reproduction device 7C performs the processes in step S301 through S309 for acoustic signals in the next process unit period. When the process are to be terminated (No in step S310), the image and audio reproduction device 7C terminates the reproduction process.

When information representing an area in which the abnormal sound was generated is included in an image displayed on the display device 8, the operator of the monitoring equipment 14 can reproduce the abnormal sound by manipulating the input device 10. In response to a manipulation of the input device 10 by operator to select an arbitrary position in the area in which the abnormal sound was generated, the control device 15 performs the process illustrated in FIG. 20.

Figure 20:
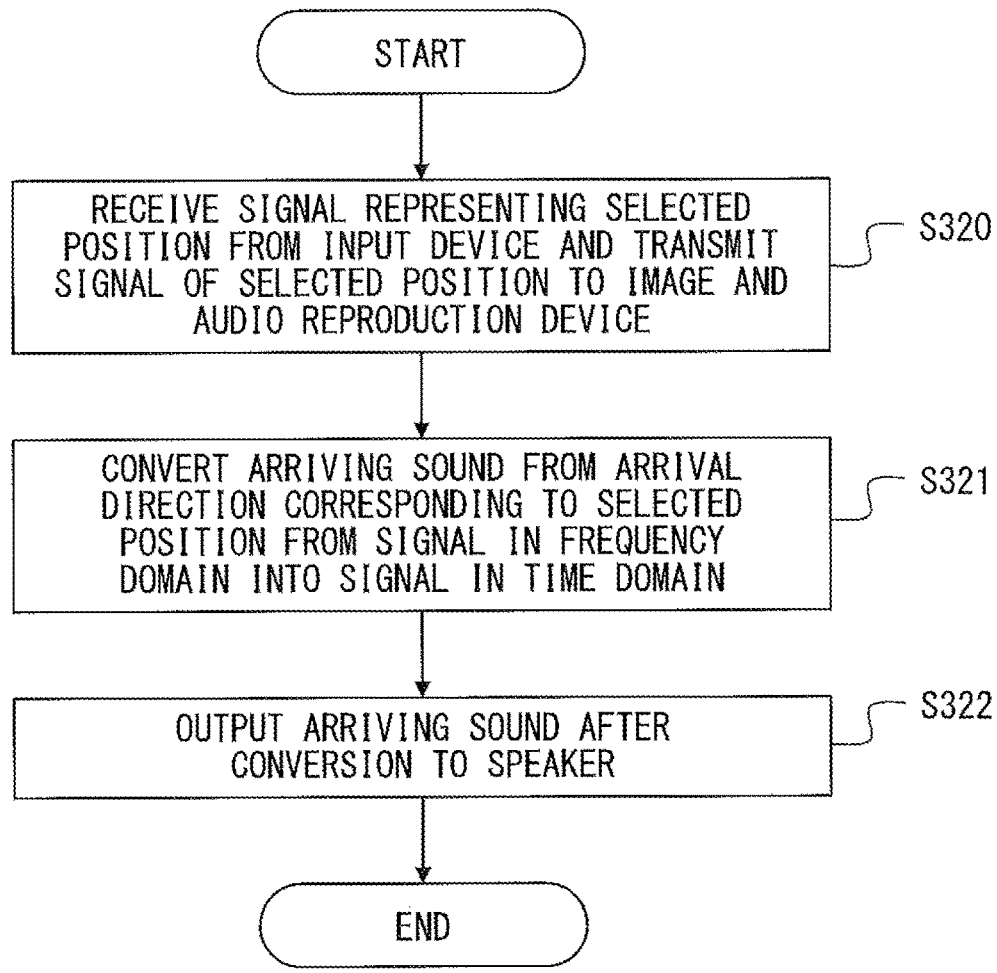
FIG. 20 explains contents of a process that is performed by the controller device according to the third embodiment in cooperation with the image and audio reproduction device.

FIG. 20 explains contents of a process that is performed by the controller device according to the third embodiment in cooperation with the image and audio reproduction device.

The control device 15 first receives a signal representing a selected position from the input device 10, and transmits the signal of the selected position to the image and audio reproduction device 7C (step S320). The process in step S320 is performed by the control unit 1502. A signal representing the selected position transmitted by the control unit 1502 is received by the arriving sound transmission unit 752 of the image and audio reproduction device 7C. Receiving a signal representing the selected position, the arriving sound transmission unit 752 extracts an arriving sound from the arrival direction corresponding to the selected position so as to transmit it to the control device 15.

Receiving an arriving sound from an arrival direction corresponding to a selected position, the control device 15 converts the received arriving sound from a signal in a frequency domain (frequency spectrum) into a signal in a time domain (step S321). The process in step S321 is performed by the audio process unit 1501B. After step S312, the audio process unit 1501B outputs the arriving sound after being converted into a signal in a time domain to the speaker 9 (step S322).

As described above, the present embodiment uses an image and acoustic signal obtained from the image capturing devices 2 (2A through 2C) and the microphone arrays 11 (11A through 11C) connected to the image and audio reproduction device 7C via the communication network 13, and decides the presence or absence of the generation of an abnormal sound in an image. This permits the monitoring of the generation of an abnormal sound in a plurality of monitored areas by using a pair of the image and audio reproduction device 7C and the monitoring equipment 14.

Also, differently from the first or second embodiment, the present embodiment decides whether or not an abnormal sound has been generated, on the basis of the display position of a case when a group of arrival directions with a high correlation is displayed and on the basis of the SNR of the arriving sound. When an abnormal sound has been generated, that sound is sometimes a sound different from those in a usual condition, such as a large sound, at a position close to the generation source. Thereby, when an abnormal sound has been generated, changes can easily occur to the position or the shape of an area representing a group of arrival directions with a high correlation at a position close to the generation source. Also, when a great change has occurred to the display position, the present embodiment determines that an abnormal sound is generated only when the SNR is equal to or higher than a prescribed threshold. This can prevent a situation in which a change in the display position caused by a noise, which is not an operation sound of a monitoring-target equipment, is mistaken as a change caused by the generation of an abnormal sound.

The reproduction processes explained in the first through third embodiments above are just exemplary and part of the processes may be changed in accordance with the necessity. It is also possible for example to analyze an image captured by the image capturing device so as to estimate the distance to each object in the image and generate an arriving sound by folding a transmission characteristics based on the arrival direction and the distance into a plurality of acoustic signals on the basis of the estimated distance and arrival direction in the arriving sound generation units 722 and 742.

A correlation between arriving sounds from adjacent arrival directions is not limited to a correlation of powers in a time domain or power spectrums in a frequency domain, or may be a correlation of time change amounts of power spectrums in a frequency domain.

Also, the image and audio reproduction devices 7A through 7C above may be implemented by for example a computer and a program that causes the computer to execute the above reproduction processes. Hereinbelow, a computer that can be operated as the image and audio reproduction devices 7A through 7C is explained by referring to FIG. 21.

FIG. 21 illustrates a hardware configuration of a computer.

As illustrated in FIG. 21, a computer 20 includes a processor 2001, a main memory 2002, an auxiliary memory 2003, an input device 2004, a display device 2005, a communication device 2006, an interface device 2007 and a medium driving device 2008. These constituents 2001 through 2008 in the computer 20 are connected to each other via a bus 2010 so that data can be exchanged between the constituents.

The processor 2001 is a processing device such as a central processing unit (CPU) etc., and controls the entire operation of the computer 20 by executing various types of programs including an operating system.

The main memory 2002 includes a Read Only Memory (ROM) and a Random Access Memory (RAM). The ROM in advance stores for example a prescribed basic control program etc. that is read by the processor 2001 upon the activation of the computer 20. Also, the RAM is used as a working storage area in accordance with the necessity when the processor 2001 executes various programs.

The auxiliary memory 2003 is a storage device having a capacity larger than that of the main memory 2002 such as a hard disk drive (HDD), a solid state drive (SSD), etc. The auxiliary memory 2003 is made to store various types of programs executed by the processor 2001, various types of data, etc. An example of a program stored in the auxiliary memory 2003 is for example a program that causes the computer 20 to execute for example the process illustrated in FIG. 5 through FIG. 7, in FIG. 13 through FIG. 15 or in FIG. 19. An example of data stored n the auxiliary memory 2003 is an image signal obtained from the image capturing device 2, an acoustic signal obtained from the sound pickup device, etc.

An example of the input device 2004 is a keyboard or a mouse. The input device 2004, manipulated by the operator of the computer 20, transmits input information associated with that manipulation to the processor 2001. Also, a touch panel that is overlapped on the display surface of the display device 2005 for example may be used as the input device 2004.

An example of the display device 2005 is a liquid crystal display device. The liquid crystal display device displays various types of texts, images, etc. in accordance with display data transmitted from the processor 2001 etc.

The communication device 2006 is a device that connects the computer 20 to a different communication device so that communications are possible in accordance with a prescribed communication standard. An example of the communication device 2006 may be a device that connects the computer 20 and the relay device 4 by wireless short-distance or long-distance communications or may be a device that connects the computer 20 to the communication network 13 such as the Internet etc. via wired or wireless communications.

An example of the interface device 2007 is an input/output device for connecting the speaker 9 or other electronic devices to the computer 20.

The medium driving device 2008 reads a program and data stored in a portable recording medium (not illustrated) and writes data etc. stored in the auxiliary memory 2003 to a portable recording medium. A flash memory having a USB-based connector for example may be used as a portable recording medium. Also, when the computer 20 is provided with a reader/writer of a memory card that can be used as the medium driving device 2008, a memory card compatible with the reader/writer (SD-based memory card etc. for example) can be used as a portable recording medium. Further, when the computer 20 is provided with an optical disk drive that can be used as the medium driving device 2008, an optical disk such as a Compact Disc (CD), a Digital Versatile Disc (DVD), a Blu-ray Disc (Blu-ray is a registered trade mark), etc. can be used as a portable recording medium.

In this computer 20, the processor 2001 reads a program including the above described processes from the auxiliary memory 2003 and executes a reproduction process on an acoustic signal obtained from a sound pickup device in cooperation with the main memory 2002, the auxiliary memory 2003, etc. During the execution of a reproduction process, the processor 2001 functions (or operates) as for example the correlation value calculation unit 702, the group setting unit 703, the acoustic-characteristic amount calculation unit 704, the vibration-characteristic amount calculation unit 705, the state decision unit 706 and the reproduction unit 707. Note that the processor 2001 may have part of the arithmetic operations in reproduction processes executed by a different arithmetic process device (not illustrated) such as a digital signal processor (DSP) etc.

Also, the computer 20 used as the image and audio reproduction devices 7A through 7C does not have to include all the constituents illustrated in FIG. 21, and some of the constituents may be omitted in accordance with the purposes or conditions. Also, the computer 20 is not limited to a general-purpose type computer that implements a plurality of functions by executing various types of programs, but may be an information processing apparatus dedicated to the processes explained in the first through third embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image and audio reproduction device comprising:
a memory configured to store an image captured by an image capturing device and a plurality of acoustic signals whose arrival directions are respectively a plurality of locations, at which a sound is picked up by a sound pickup device, in an image capturing scope of the image capturing device; and
a processor configured to set, as one group, arrival directions of acoustic signals with a high degree of similarity of amounts of characteristics on the basis of a degree of similarity of the amounts of characteristics between acoustic signals that are from the arrival directions adjacent to each other, and to add information to the image so as to reproduce the image, the information representing a position of the group in an image capturing scope of the image capturing device.

2. The image and audio reproduction device according to claim 1, wherein
the processor extracts the acoustic signal having a sound pressure higher than a prescribed value from among the plurality of acoustic signals, and treats, as one group, the extracted acoustic signal and a different acoustic signal with a high degree of similarity of the amount of characteristics to that of the acoustic signal.

3. The image and audio reproduction device according to claim 1, wherein
the processor generates a figure representing an area in the image corresponding to arrival directions of the acoustic signals included in the group, and superimposes the generated figure on the image so as to reproduce the image.

4. The image and audio reproduction device according to claim 1, wherein
the processor, receiving an input manipulation to select a point in the image being reproduced, reproduces an acoustic signal whose arrival direction is an eye direction of the image capturing device corresponding to a selected point in the image.

5. The image and audio reproduction device according to claim 1, wherein
the processor generates acoustic signals whose arrival directions are respectively a plurality of locations set in an image captured by the image capturing device from among the acoustic signals picked up by the sound pickup device, on the basis of a positional relationship between an image capturing scope of the image capturing device and the sound pickup device.

6. The image and audio reproduction device according to claim 5, wherein
the processor generates the arriving sound by adding a transmission characteristic based on the arrival direction to a plurality of acoustic signals that are obtained from a microphone array device including a plurality of arrayed sound pickup devices and that are respectively picked up by the plurality of sound pickup devices.

7. The image and audio reproduction device according to claim 5, wherein
the processor estimates a distance to an object from the image capturing device for each object in an image captured by the image capturing device, and adds a transmission characteristic based on the arrival direction and the distance to the plurality of acoustic signals so as to generate the arriving sound on the basis of a direction of each object and the estimated distance.

8. The image and audio reproduction device according to claim 1, wherein
the processor calculates a power of the acoustic signal for each of the arrival directions, and adds only information representing a position of a group including an arrival direction of an acoustic signal whose calculated power is equal to or higher than a prescribed threshold in the set group to an image captured by the image capturing device so as to reproduce the image.

9. The image and audio reproduction device according to claim 1, wherein
the processor calculates a signal-to-noise ratio of the acoustic signal for each of the arrival directions, and adds only information representing a position of a group including an arrival direction of an acoustic signal whose signal-to-noise ratio is equal to or higher than a prescribed threshold in the set group to the image so as to reproduce the image.

10. The image and audio reproduction device according to claim 1, wherein
the processor calculates a power of an acoustic signal in a time domain for each of the arrival directions so as to calculate a mutual correlation coefficient of powers of the acoustic signals that are from the arrival directions adjacent to each other, and sets the group by treating the calculated mutual correlation coefficient as a degree of similarity of the amount of characteristics.

11. The image and audio reproduction device according to claim 1, wherein
the processor performs a frequency analysis on the acoustic signal for each of the arrival directions so as to calculate a power spectrum, and calculates a mutual correlation coefficient between power spectrums of the acoustic signals that are from the arrival directions adjacent to each other so as to set the group by treating the calculated mutual correlation coefficient as a degree of similarity of the amount of characteristics.

12. The image and audio reproduction device according to claim 1, wherein
the processor performs a frequency analysis on the acoustic signal for each of the arrival directions so as to calculate a time change amount of a power spectrum, and calculates a mutual correlation coefficient between time change amounts of power spectrums of the acoustic signals that are from the arrival directions adjacent to each other so as to set the group by treating the calculated mutual correlation coefficient as a degree of similarity of the amount of characteristics.

13. The image and audio reproduction device according to claim 1, wherein the memory further stores the amount of characteristics of the acoustic signal of a case when an image capturing scope of the image capturing device is in a normal condition, and
the processor compares the amount of characteristics calculated on the basis of the acoustic signal for each of the arrival directions and an amount of characteristics of the acoustic signals in the normal condition so as to decide whether or not acoustic signals used for the calculation of the amount of characteristics is normal, and adds only information representing a position of a group including an arrival direction of the acoustic signal decided to be not normal in the set group to the image so as to reproduce the image.

14. The image and audio reproduction device according to claim 13, wherein
the memory further stores an amount of characteristics of a vibration based on vibration information in the image capturing scope of a case when an image capturing scope of the image capturing device is in a normal condition, and
the processor calculates an amount of characteristics of the vibration on the basis of the vibration information obtained from a vibration sensor set in an image capturing scope of the image capturing device, and decides whether or not the acoustic signals used for the calculation of the amount of characteristics of the acoustic signals are normal on the basis of a result of comparison between the calculated amount of characteristics of the acoustic signals and the amount of characteristics of the acoustic signals in the normal condition and a result of comparison between a amount of characteristics of the vibration based on the calculated vibration information and an amount of characteristics of the vibration in the normal condition.

15. The image and audio reproduction device according to claim 1, wherein
the processor makes the memory store a display position in information representing a position of the group added to the image, calculates a display position of a case when the set group is superimposed on the image and the image is displayed, so as to thereafter decide whether or not an acoustic signal of a group used for calculation of the display position is normal by comparing the calculated display position and the display position that the memory is made to store, and adds only information representing a position of a group including an arrival direction of the acoustic signal decided to be not normal in the set group to the image so as to reproduce the image.

16. An image and audio reproduction method comprising:
obtaining, by using a computer, an image captured by an image capturing device and a plurality of acoustic signals whose arrival directions are respectively a plurality of locations in an image capturing scope of the image capturing device; and
setting, by using the computer and as one group, arrival directions of acoustic signals with a high degree of similarity of amounts of characteristics on the basis of a degree of similarity of the amounts of characteristics between acoustic signals that are from the arrival directions adjacent to each other; and
adding, by using the computer, information to an image captured by the image capturing device so as to reproduce the image, the information representing a position of the group in an image capturing scope of the image capturing device.

17. The image and audio reproduction method according to claim 16, the method further comprising comparing, by the computer, the amount of characteristics of the obtained acoustic signal and a prescribed amount of characteristics of the acoustic signals of a case when an image capturing scope of the image capturing device is in a normal condition, for each of the arrival directions so as to decide whether or not the obtained acoustic signals are normal, wherein only information representing a position of a group including the acoustic signal decided to be not normal is added by using the computer to an image so as to reproduce the image when the information representing a position of the group is added to the image captured by the image capturing device so as to reproduce the image.

18. The image and audio reproduction method according to claim 16, the method further comprising reproducing, by using the computer, an acoustic signal whose arrival direction is an eye direction of the image capturing device corresponding to a point selected in the image when the computer received an input manipulation to select a point in the image being reproduced.

19. A non-transitory computer-readable recording medium having stored therein a program for causing a computer to execute a process of reproducing an image and audio, the process comprising:

obtaining an image captured by an image capturing device and a plurality of acoustic signals whose arrival directions are respectively a plurality of locations in an image capturing scope of the image capturing device; and setting, as one group, arrival directions of acoustic signals with a high degree of similarity of amounts of characteristics on the basis of a degree of similarity of the amounts of characteristics between acoustic signals that are from the arrival directions adjacent to each other; and adding information to an image captured by the image capturing device so as to reproduce the image, the information representing a position of the group in an image capturing scope of the image capturing device.

* * * * *